(12) United States Patent
Takei et al.

(10) Patent No.: US 10,963,898 B2
(45) Date of Patent: Mar. 30, 2021

(54) COMPUTER SYSTEM FOR PERFORMING DISPLAY CONTROL FOR ADVERTISEMENT

(71) Applicant: BANDAI NAMCO Entertainment Inc., Tokyo (JP)

(72) Inventors: Yuka Takei, Tokyo (JP); Akio Onda, Warabi (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 246 days.

(21) Appl. No.: 15/855,124

(22) Filed: Dec. 27, 2017

(65) Prior Publication Data

US 2018/0181976 A1 Jun. 28, 2018

(30) Foreign Application Priority Data

Dec. 28, 2016 (JP) .............................. JP2016-256827

(51) Int. Cl.

| | |
|---|---|
| *G06Q 30/02* | (2012.01) |
| *A63F 13/61* | (2014.01) |
| *A63F 13/69* | (2014.01) |
| *A63F 13/67* | (2014.01) |
| *A63F 13/35* | (2014.01) |
| *A63F 13/335* | (2014.01) |
| *A63F 13/32* | (2014.01) |
| *A63F 13/332* | (2014.01) |

(52) U.S. Cl.
CPC ......... *G06Q 30/0209* (2013.01); *A63F 13/61* (2014.09); *A63F 13/67* (2014.09); *A63F 13/69* (2014.09); *G06Q 30/0277* (2013.01); *A63F 13/32* (2014.09); *A63F 13/332* (2014.09); *A63F 13/335* (2014.09); *A63F 13/35* (2014.09)

(58) Field of Classification Search
None
See application file for complete search history.

(56) References Cited

U.S. PATENT DOCUMENTS

| | | | |
|---|---|---|---|
| 9,047,609 B2* | 6/2015 | Ellis ....................... | G06Q 30/02 |
| 2008/0244635 A1* | 10/2008 | Pollard .................. | G06Q 30/02 |
| | | | 725/23 |
| 2009/0048918 A1* | 2/2009 | Dawson .................. | A63F 13/79 |
| | | | 705/14.26 |

(Continued)

FOREIGN PATENT DOCUMENTS

| | | |
|---|---|---|
| JP | 2003-529093 A | 9/2003 |
| WO | 01/39067 A1 | 5/2001 |

OTHER PUBLICATIONS

Lange-Nielsen, "The Power-up Experience: A Study of Power-ups in Games and Their Effect on Player Experience," Proceedings of DiGRA 2011 Conference: Think Design Play, 2011 (Year: 2011).*

*Primary Examiner* — Christopher B Tokarczyk
(74) *Attorney, Agent, or Firm* — Posz Law Group, PLC

(57) ABSTRACT

When a user selects an input element from entertainment elements, related to a game, possessed by the user and accepts an advertisement output offer, advertisement watching control starts. Improvement control including 1) improving a parameter value associated with the input element, or 2) improving the parameter value associated with the input element and changing a display mode of the input element is performed in return for advertisement watching.

20 Claims, 30 Drawing Sheets

(56) References Cited

U.S. PATENT DOCUMENTS

| | | | |
|---|---|---|---|
| 2009/0328088 A1* | 12/2009 | Harris | H04N 21/47815 |
| | | | 725/10 |
| 2013/0005475 A1* | 1/2013 | Mahajan | A63F 13/216 |
| | | | 463/42 |
| 2014/0278853 A1* | 9/2014 | Brown | G06Q 30/0209 |
| | | | 705/14.12 |

* cited by examiner

FIG.11

| ADVERTISEMENT INFORMATION CONDITION | | 572 |
|---|---|---|
| ADVERTISEMENT ID CONDITION | LIST OF ADVERTISEMENT IDS CORRESPONDING TO SPECIFIC ADVERTISEMENT (NO. 1) | 572a |
| CATEGORY CONDITION | CATEGORY FOR CONTENT OF ADVERTISEMENT (NO. 1) | 572b |
| SPONSOR CONDITION | SPECIFIC SPONSOR ID (NO. 1) | 572c |
| REQUIRED WATCHING TIME CONDITION | 90 SECONDS | 572d |
| SAME ADVERTISEMENT WATCHED TIMES CONDITION | FOR THE SECOND TIME (OR MORE) | 572e |
| ⋮ | | |

FIG.12

| WATCHING SETTING INFORMATION CONDITION | | |
|---|---|---|
| ADVERTISEMENT TYPE CONDITION | MOVIE | 573a |
| SIZE CONDITION | LARGE | 573b |
| DISPLAYED POSITION CONDITION | SCREEN CENTER PORTION | 573c |
| ⋮ | | |
| TIMING CONDITION | WHEN STAGE IS FINISHED | 573e |
| WATCHED DATE CONDITION | 12/23 TO 12/25 | 573f |
| WATCHED TIME ZONE CONDITION | 18:00 TO 24:00 | 573g |

573

COMPUTER SYSTEM FOR PERFORMING DISPLAY CONTROL FOR ADVERTISEMENT

Japanese Patent Application No. 2016-256827 filed on Dec. 28, 2016 is hereby incorporated by reference in its entirety.

BACKGROUND

A "reward advertisement" has become a popular means for gaining profits in an online game. The reward advertisement is an advertisement that is displayed on an advertisement screen in a computer such as a user terminal, and features a reward given to a user who has watched the advertisement, accessed a website presented by the advertisement, or installed an application presented by the advertisement (see Japanese Translation of PCT International Application Publication No. JP-T-2003-529093 for example).

In the above-described reward advertisement, the content of the reward advertisement does not basically change within a determined advertising period. Thus, a user playing a game watches the same advertisement over and over again. The advertisement could be regarded as an entertainment when it is seen for the first time. However, watching the same advertisement over and over again is nothing more than a cumbersome obligation. Thus, the user is extremely less incentivized to watch the advertisement despite the reward, and might start skipping the advertisement to be watched or might even feel negative about the advertised product.

This is a problem not only in an advertisement watched during gameplay, but is also a problem in other situations where a given advertisement is watched on a display screen operated by a user while a main program is being executed (an example other than the game includes a web browser).

SUMMARY

According to one aspect of the invention, there is provided a computer system comprising: at least one processor or circuit programmed to execute as:

controlling implementation of a game;

selecting an input element from an entertainment element, related to the game, possessed by a user;

performing watching control of an advertisement for improvement control in return for advertisement watching, the improvement control including 1) improving a parameter value associated with the input element, or 2) improving the parameter value associated with the input element and changing a display mode of the input element; and performing the improvement control when the watching control satisfies a completion equivalent condition.

BRIEF DESCRIPTION OF THE DRAWINGS

FIG. 11 is a diagram illustrating an example of a data structure of advertisement information conditions.

FIG. 12 is a diagram illustrating an example of a data structure of watching setting information conditions.

DESCRIPTION OF EXEMPLARY EMBODIMENTS

Figure 1:
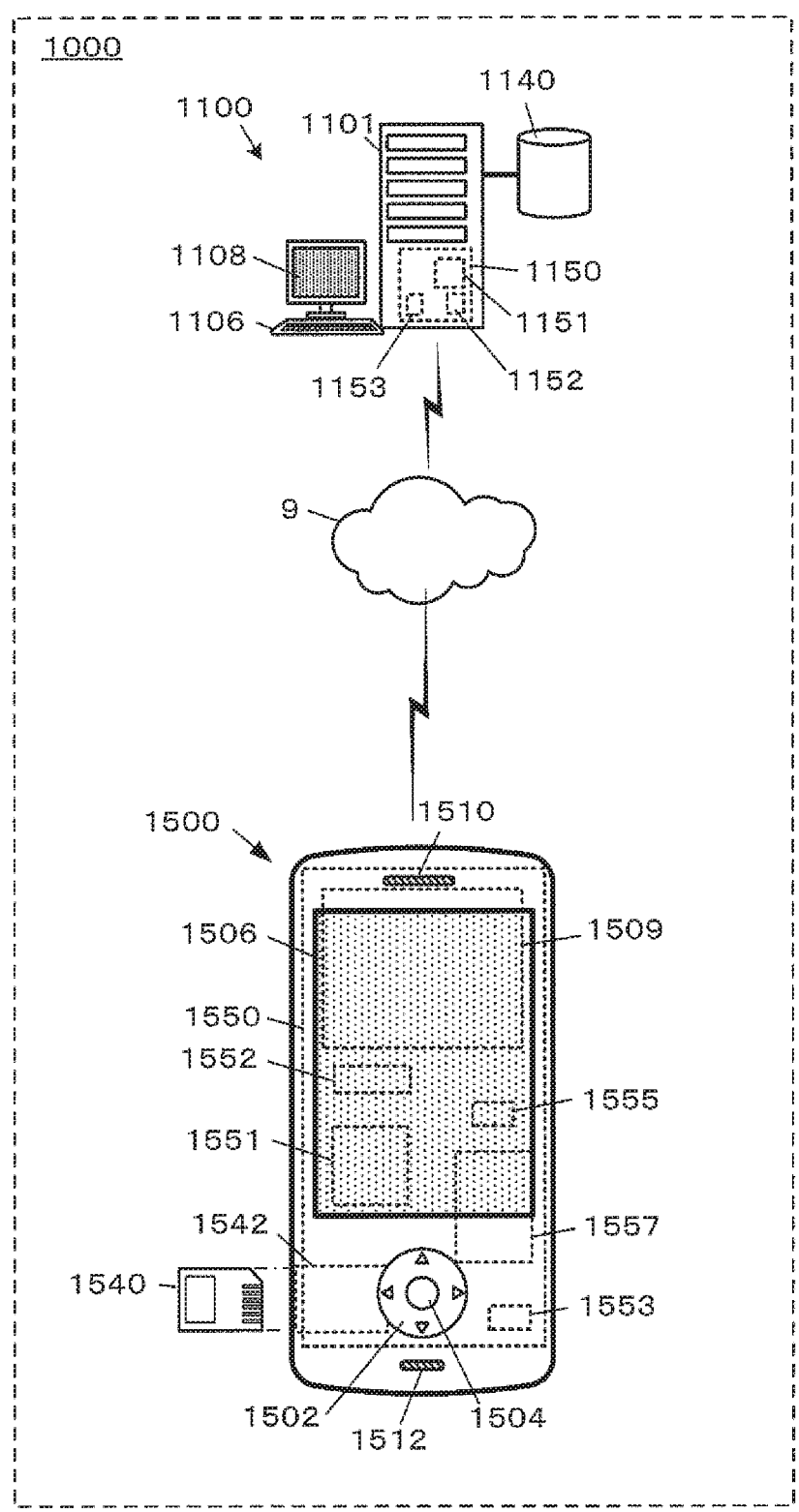
FIG. 1 is a diagram illustrating an example of a configuration of a game system.

The present embodiment can provide a new technique of incentivizing a user to watch an advertisement.

According to one embodiment of the invention, there is provided a computer system comprising: at least one processor or circuit programmed to execute as:

controlling implementation of a game;

selecting an input element from an entertainment element, related to the game, possessed by a user;

performing watching control of an advertisement for improvement control in return for advertisement watching, the improvement control including 1) improving a parameter value associated with the input element, or 2) improving the parameter value associated with the input element and changing a display mode of the input element; and performing the improvement control when the watching control satisfies a completion equivalent condition.

The "computer system" as used herein may be a system including a single computer, and may be a system including a plurality of computers that are connected to each other to be capable of performing data communications with each other through a communication line.

The "entertainment element" as used herein includes an item usable in the game, an ability of a player character or the like (such as moves, magic spells, and skills for example), a parameter value related to the game, an appearance changing element for the player character or the like, a ticket for playing minigames and special stages, data on character voice read by a voice actor, a BGM data, and the like.

The "watching control completion equivalent condition" as used herein includes a timing at which the watching control ends, and also includes a timing that can be technically regarded as the end of advertisement watching. For example, a timing at which 30 seconds elapse after a 30-second movie advertisement has started to be displayed can be counted as the timing at which the watching control is completed, of course. Such an advertisement may include last five seconds involving fade out or a sponsor company logo being displayed until the end, and thus can be regarded as a scene after the displaying of the content of the advertisement has technically ended. In such a case, technically, the main portion of the advertisement has been completely presented at a point where 25 seconds have elapsed. Thus, the point is regarded as the watching control completed timing, and thus is regarded as a timing at which the completion equivalent condition is satisfied.

With this configuration, the improvement control is performed for the input element, selected from entertainment elements possessed by the user, in return for advertisement watching, whereby the player can be incentivized to watch the advertisement.

The computer system may further comprise selecting the advertisement as a target of the watching control based on an operation input by the user.

With this configuration, the user can select the watching target advertisement. With the user selecting the advertisement to be watched, the user is less likely to be fed up with the advertisement and skip the advertisement displayed, as in the conventional cases.

The computer system may further comprise determining a level of improving the parameter value in the improvement control at least based on an advertisement that is a target of the watching control.

With this configuration, the level of improvement of the parameter value in the improvement control can be changed in accordance with which advertisement is watched. Thus, the improvement of the entertainment element in return for the advertisement watching can be more attractive, and the user can be more incentivized to watch the advertisement.

The computer system may further comprise performing watching setting related to the watching control.

With this configuration, the watching setting related to the watching control can be changed.

The computer system may further comprising determining a level of improving the parameter value in the improvement control at least based on the watching setting.

In the computer system, the selecting the input element may include selecting the input element based on an operation input by the user, the computer system may further comprise determining a level of improving the parameter value in the improvement control at least based on the input element.

The computer system may further comprise determining a level of improving the parameter value in the improvement control based on a quantity of an entertainment element, possessed by the user, which is the same as the input element and/or based on a quantity of the selected input element.

With this configuration, a wide variety of contents of the improvement control can be achieved. Thus, the entertainment element obtained in return for the advertisement watching can be more attractive, and the user can be more incentivized to watch the advertisement.

In the computer system, the selecting the input element may include selecting the input element serving as a base and the input element serving as a material based on an operation input by the user, the computer system may further comprise determining a level of improving the parameter value of the input element serving as the base in the improvement control based on the input element serving as the material.

With this configuration, the improvement control is performed on the input element selected as the base by the user, based on the input element selected as the material by the user. Thus, the improvement control can be implemented as what is known as "item power up" or "character evolution".

The computer system may further comprise determining a level of improving the parameter value in the improvement control based on predetermined compatibility between the input element and the advertisement as a target of the watching control.

With this configuration, the level of improvement of the parameter value in the improvement control changes based on the compatibility between the input element and the advertisement. Thus, the entertainment element obtained in return for the advertisement watching can be more attractive, and the user can be even more incentivized to watch the advertisement.

In the computer system, the advertisement may be associated with information indicating a designated position, the computer system may further comprise: acquiring positional information indicating a position of the user; and determining a level of improving the parameter value in the improvement control at least based on positional relationship between the designated position and the position indicated by the positional information.

With this configuration, the level of improvement of the parameter value in the improvement control can be changed in accordance with an environment in which the user watches the advertisement. Thus, the entertainment element obtained in return for the advertisement watching can be more attractive, and the user can be even more incentivized to watch the advertisement.

In the computer system a, the entertainment element may be associated with a valid period during which the entertainment element is selectable as the input element, the selecting the input element may include selecting the input element from entertainment elements each having the valid period not expired yet.

With this configuration, the valid period is set to the entertainment element, and the input element is selected based on the valid period. This motivates the user to select the entertainment element as the input element, and thus motivates the user to watch the advertisement.

The computer system may further comprise providing a preview of a content of the improvement control to be performed when the completion equivalent condition is satisfied, before the watching control satisfies the completion equivalent condition.

With this configuration, the user can recognize the content of the improvement control to be executed. Thus, the advertisement is watched with higher contentment in terms of give-and-take, than in a case of a conventional reward advertisement not enabling the player to know what is given until the reward is actually given. This also contributes to further incentivizing the player to watch the advertisement.

The computer system may further comprise setting a performing possibility of the improvement control, the performing the improvement control may include determining whether or not to perform the improvement control based on the performing possibility.

With this configuration, the improvement control is not activated in some cases. Thus, the user can feel more excited by wondering whether the improvement of the entertainment element in return for the advertisement watching succeeds or fails. Thus, the advertisement watching involves higher excitement.

The computer system may further comprise changing the performing possibility based on a progress of the watching control, in such a manner that the performing possibility is higher in a case where the advertisement is entirely watched than in a case where the advertisement is started to be watched.

With this configuration, the user can be more motivated to entirely watch the advertisement.

According to another embodiment of the invention, there is provided an advertisement output control system comprising: a server system that is the above computer system; and a user terminal to which the user inputs an operation, the server system and the user terminal being connected to the advertisement output control system to be capable of performing a communication with each other.

With this configuration, an advertisement output control system that can achieve the effects described above can be implemented.

According to another embodiment of the invention, there is provided an advertisement output control device comprising an operation input section to which the user inputs an operation, the advertisement output control device being the above computer system.

With this configuration, an advertisement output control device that can achieve the effects described above can be implemented.

Exemplary embodiments of the present invention are described below. It is a matter of course that modes to which the present invention can be applied are not limited to the embodiments described below.

First Embodiment

An example of output control for a given advertisement in a game starting based on a gameplay start operation by a player is described as a first embodiment. In the present embodiment, a single-play action roll playing game (ARPG) is described as an example of the game. However, genre of the game according to the present invention and how it is played are not limited to this.

[Hardware Configuration]

First of all, an example of a hardware configuration according to the present embodiment is described.

FIG. 1 is a diagram illustrating an example of a configuration of a game system functioning as an advertisement output control system according to the present embodiment. A game system 1000 according to the present embodiment is a computer system including a server system 1100 and a user terminal 1500 that can be connected to a communication line 9 to communicate with each other to exchange data. The illustrated example includes a single user terminal 1500. However, in an actual operation, a plurality of user terminals 1500 of different users who play the game (hereinafter, referred to as "players") may each be connected to and communicate with the server system 1100. The game system 1000 as a whole may be referred to as a computer system, or the sever system 1100 and the user terminal 1500 may each be referred to as an individual computer system.

The communication line 9 is a communication channel that enables data communications. Specifically, the communication line 9 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The server system 1100 includes a main body device 1101, a keyboard 1106, a touch panel 1108, and a storage 1140. A control board 1150 is provided in the main body device 1101.

The control board 1150 includes a processor of various types (e.g., a central processing unit (CPU) 1151, a graphics processing unit (GPU), and a digital signal processor (DSP)), an IC memory 1152 of various types (e.g., a video random access memory (VRAM), a random access memory (RAM), and a read only memory (ROM)), and a communication device 1153. The control board 1150 may partially or entirely be implemented with an application specific integrated circuit (ASIC), a field-programmable gate array (FPGA), and a system on a chip (SoC).

Through a calculation process performed by the control board 1150 based on a predetermined program and data, the server system 1100 implements 1) a user management function of managing information on a process or a user related to user registration and the like, 2) an online shopping function of selling various items, usable in the game, to the user online, and 3) a game management function of providing data required to play the game with the user terminal 1500, to manage play control on the game played with the user terminal 1500. Thus, the game according to the present embodiment is implemented as one type of client-server games.

The server system 1100 is illustrated/described as a single server. Alternatively, a plurality of blade servers, in charge of various functions, may be installed while being connected to each other via an internal bus to be capable of performing data communications with each other. Furthermore, a plurality of independent servers, disposed in locations distant from each other, may perform data communications with each other via the communication line 9 to function as the server system 1100 as a whole.

The server system 1100 is not limited to a configuration managed by a single administrator, and may be a system in which servers managed by different administrators are connected to each other in such a manner as to be able to communicate with each other. For example, the game and the online shopping may be managed by different administrators and implemented with difference servers connected to each other in such a manner as to be able to communicate with each other to function as an integrated server system.

The user terminal 1500 is a computer system, usable by a registered user serving as a player to play the game, and is an electronic device (electronic apparatus) that can access the server system 1100 via the communication line 9 to implement a game. The user terminal 1500 according to the present embodiment is a device known as a smartphone. The user terminal 1500 may also be a portable game device, a game controller, a personal computer, a tablet computer, a wearable computer, an arcade game device, or the like.

The user terminal 1500 includes an arrow key 1502, a button switch 1504, a touch panel 1506 that functions as an image display device and as a touch position input device, a speaker 1510, a built-in battery 1509, a microphone 1512, a control board 1550, and a memory card reader 1542 that can write and read data to and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data to and from an IC card as a credit card or a prepaid card usable for payment involved in playing the game.

The control board 1550 includes a processor of various types (e.g., a CPU 1551, a GPU, and a DSP); an IC memory 1552 of various types (e.g., a VRAM, a RAM, and a ROM), a wireless communication module 1553 for performing wireless communications with a mobile phone base station, a wireless LAN base station, or the like connected to the communication line 9, a position measurement module 1555; an interface circuit 1557; and the like.

The position measurement module 1555 can receive a signal provided from the position measurement system, and can output position measurement information at a predetermined interval (for example, once a second). The position measurement system according to the present embodiment is a Global Positioning System (GPS). Thus, the position measurement module 1555 may be a known "GPS module", a "GPS receiver", or the like. The "position measurement information" includes measurement date and time (Coordinated Universal Time (UTC)), positional coordinates (latitude/longitude/altitude), and the like. The positional coordinates obtained by the position measurement module 1555 are hereinafter referred to as "player positional information".

The interface circuit 1557 includes circuits such as a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, a signal input-output circuit that inputs and outputs a signal to and from the memory card reader 1542, and a signal input-output circuit that inputs and outputs a signal to and from the position measurement module 1555.

The elements mounted on the control board 1550 are electrically connected with each other via a bus circuit or the like to be capable of reading and writing data and exchanging signals. The control board 1550 may partially or entirely be implemented with an ASIC, an FPGA, or a SoC. The control board 1550 stores a client program and various types of data, for implementing a function as the user terminal of the game according to the present embodiment, in the IC memory 1552.

The client program and various types of setting data are downloaded by the user terminal 1500 from the server system 1100 in the present embodiment. The program and the data may also be read from a storage medium such as the memory card 1540 additionally provided.

Figure 2:
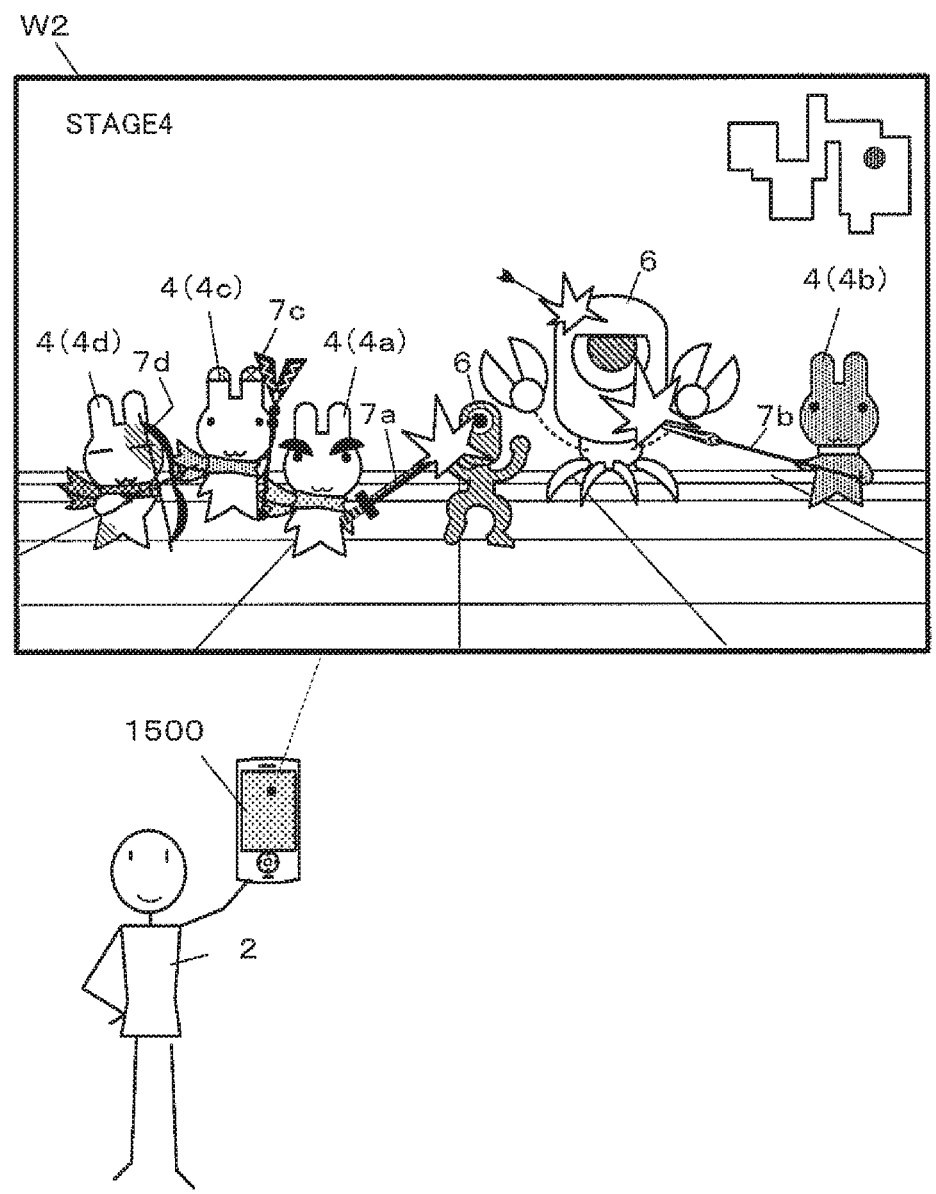
FIG. 2 is a diagram illustrating a content of a game.

FIG. 2 is a diagram illustrating a content of the game according to the present embodiment. The game according to the present embodiment is a single-play action roll playing game (ARPG) that is played by a player 2 using the user terminal 1500. Note that the game may be a multi-play game or a game of another genre.

In the game according to the present embodiment, the player 2 picks up a predetermined number of characters, from his or her possessed characters, to build a deck (a group, a party, or a team of player characters), and selects and plays a game stage. The player 2 operates the characters in the deck thus built, serving as player characters 4 (4a, 4b, . . . ), to achieve a goal set to the stage (such as finding a predetermined treasure or defeating a boss character, for example) while fighting with an enemy character 6 that is a non-player character (NPC) confronted in a game space of the stage.

The player 2 can enjoy the game by making the player characters 4 (4a, 4b, . . . ) equip various items 7 (7a, 7b, . . . ), usable in the game, purchased with online shopping or obtained during the gameplay. The player character 4 equipping or using a stronger item 7 can have more improved abilities, so that the player 2 can be more advantageous while playing the game. The player characters 4 (4a, 4b, . . . ) automatically obtain experience in accordance with a result of the gameplay, to grow and have higher abilities. In this context, it is important to acquire more powerful items 7.

The player characters 4 (4a, 4b, . . . ) and the items 7 (7a, 7b, . . . ) can be powered up and grown in accordance with a "traveled distance" of the player 2 or using a "bonus point".

The "traveled distance" as used herein is a distance obtained by a result of the measurement by the position measurement module 1555 for the movement of the player 2 holding the user terminal 1500 with the game turned ON. The traveled distance is automatically accumulated as much as the user travels. A designated player character 4 can grow/evolve by consuming a predetermined unit of the traveled distance each time. Thus, depending on the content of the game, the traveled distance may be regarded as a sort of food for growing the player character 4. In a game where the player character 4 is used as a weapon, the traveled distance may be regarded as a virtual money/resource spent for remodeling/powering up/development.

The "bonus point" as used herein is a point given when purchasing of an entertainment element such as an item related to the game in the online shopping satisfies a predetermined condition. A designated player character 4 or item 7 can power up/grow with a predetermined unit of the bonus point consumed each time, as in the case of the traveled distance. How the point is referred to is not limited to this. Points usable in a similar way can be given as appropriate under conditions other than the online shopping. For example, the points may be given for free in response to a user login, given as a gift selected through a free lottery after user logout, and given for free as a campaign.

Figure 3:
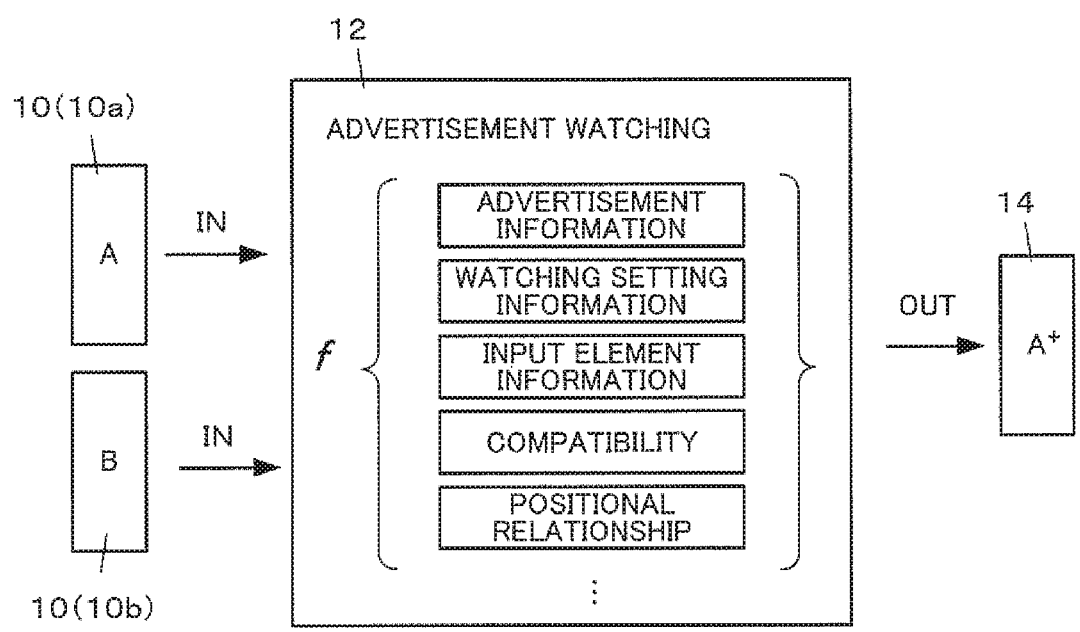
FIG. 3 is a diagram illustrating a mechanism of an advertisement.

FIG. 3 is a diagram illustrating a system of an advertisement according to the present embodiment.

The advertisement according to the present embodiment is integrated into a system for improving an entertainment element. The improvement includes "power up" for improving a parameter value of an ability and effectiveness of the player character 4 or the item 7 and "evolution" for improving a parameter value and changing a display mode of the player character 4 or the item 7. Specifically, when the player selects an input element 10 and performs advertisement watching 12, improvement control for improving the ability or the like of the input element 10 is performed. In the present embodiment, the input element after the improvement control is referred to as an "output element" so that the elements can be clearly distinguished from each other in the description. Thus, an output element 14, which is the input element 10 after the improvement control, is given to the player.

How "power up" and "evolution" are called may be changed as appropriate in accordance with a genre of the game or a setting in the game world. For example, "power up" and "evolution" may be referred to as remodeling, repairing, specification change, development, growing, job change, class up, rank up, mode change, or the like.

The "input element" and the "output element" according to the present embodiment are entertainment elements, related to the game, possessed by the user.

The "entertainment element" can be set as appropriate in accordance with the content of the game. The game according to the present embodiment is an ARPG, and thus the following elements can be set 1) what is known as an item such as a weapon, armor, goods, and a magic spell book usable by the player character 4, 2) an ability that can be additionally provided to the player character 4 (such as moves, magic spells, and skills for example), 3) improvement of the ability of the player character 4, 4) an additional outer-view changing element for the player character 4 (such as custom model data and coloring pattern for example), 5) a ticket for playing minigames and special stages, 6) data on a character voice read by a voice actor, 7) BGM data, 8) game currency, 9) a play time extension ticket, 10) a predetermined unit of the traveled distance, 11) a predetermined unit of the bonus point, and the like. Note that the entertainment element can be set as appropriate in accordance with the content of the game and the setting in the game world. For example, a free game ticket for other games, a ticket for participating in an event outside the game, and the like may also be set. These entertainment elements are hereinafter collectively referred to as an "item".

In the present embodiment, the player 2 selects one or a plurality of possessed items to be the input elements 10 (10a, 10b, . . . ) and performs the advertisement watching 12. Then, the player 2 can obtain the output element 14 ("A+" in the illustrated example), as a result of the power up or evolution of the item serving as the input element 10, in return for the advertisement watching 12. In other words, the player 2 can convert the input element 10 into the output element 14, with the advertisement watching 12 serving as a requirement or cost for the conversion. Such a system for improving an entertainment element is hereinafter collectively referred to as "item conversion".

In the present embodiment, the level of the power up/evolution pattern as a result of the item conversion, that is, the level of improvement from the input element to the output element, is set to be more advantageous than that as a result of consuming the traveled distance or the bonus point for the player character 4 or the item 7. Alternatively, there may be substantially no difference in such a level.

The input element 10 may include any type of items or combination of items that can be regarded as being suitable for a pattern for power up or evolution. Thus, the input element 10 may be a single item, a combination of a plurality of the same types of items, or a combination of n (n is a natural number) different types and quantities of items.

Types of the item to be the output element 14 (the quantity if the item is a point or the like), that is, the item as a result of the power up or evolution, which may also be referred to as a level of improvement, is determined in accordance with at least one of the following elements.

1) Advertisement information on a watching target advertisement that is an advertisement as a target of watching.

2) Watching setting information related to output control for an advertisement.

3) Input element information that is information related to the input element.

4) compatibility set between the watching target advertisement and the input element.

5) Positional relationship between positional information set to the watching target advertisement and user positional information.

For example, the "advertisement information" includes at least one of a category of the content of the advertisement, a sponsor, and required watching time.

The "watching setting information" roughly includes at least one of information related to an output format of the advertisement and a setting on time when the advertisement is provided. An example of the former may include at least one of an advertisement type (one of movie, still image, and audio only), display size, display position, whether the advertisement is a single advertisement or advertisements watched in series, and whether the advertisement is output individually or collectively. An example of the latter may include at least one of a timing (such as a situation in the game) at which the advertisement is provided, watched date and time, and a watched time zone.

An example of the "input element information" may include at least one of a combination of items serving as the input element 10, a quality and a status of the item (such as a level or a rarity of an item), the number of the items possessed by the player, and a valid period set to the item.

The "positional information set to the watching target advertisement" includes information corresponding to the positional coordinates and the altitude in the player positional information. When the watching target advertisement is an automobile, positional information on a dealer shop or a showroom of the automobile or a large advertising board may be set.

The elements based on which the output element 14 is determined may include information other than the advertisement information, the watching setting information, the input element information, the compatibility, and the positional relationship described above. Furthermore, some of these elements may be ignored and the remaining elements may be employed.

Next, a process related to the item conversion and an example of a screen displayed for a user operation, according to the present embodiment, are described in detail.

When the game according to the present embodiment starts, a timing at which the advertisement watching is possible is automatically determined. The timing at which the advertisement watching is possible, which may be set as appropriate in accordance with the content of the game, a design of a menu system, or the like, is preferably set to be at a timing involving no urgent input operation. For example, such a timing while playing the game according to the present embodiment, which is an ARPG, may be set to be while a stage map is being displayed, during movement within the map, a timing at which the player enters or exits a facility in the map, a timing at which the player in a battle can be regarded as being in a predetermined difficult situation, after a battle, a timing of displaying the result of the finished stage, while a screen for selecting the next stage or changing equipment is being displayed, during data loading, or the like. Preferable examples of such a timing, not during the gameplay, include immediately after the user login, while a screen for deck building or equipment change is being displayed before the gameplay starts, during online shopping, while a screen for selecting a stage to be played or for powering up or evolving the item 7 is being displayed, during data loading, and the like.

Figure 4:
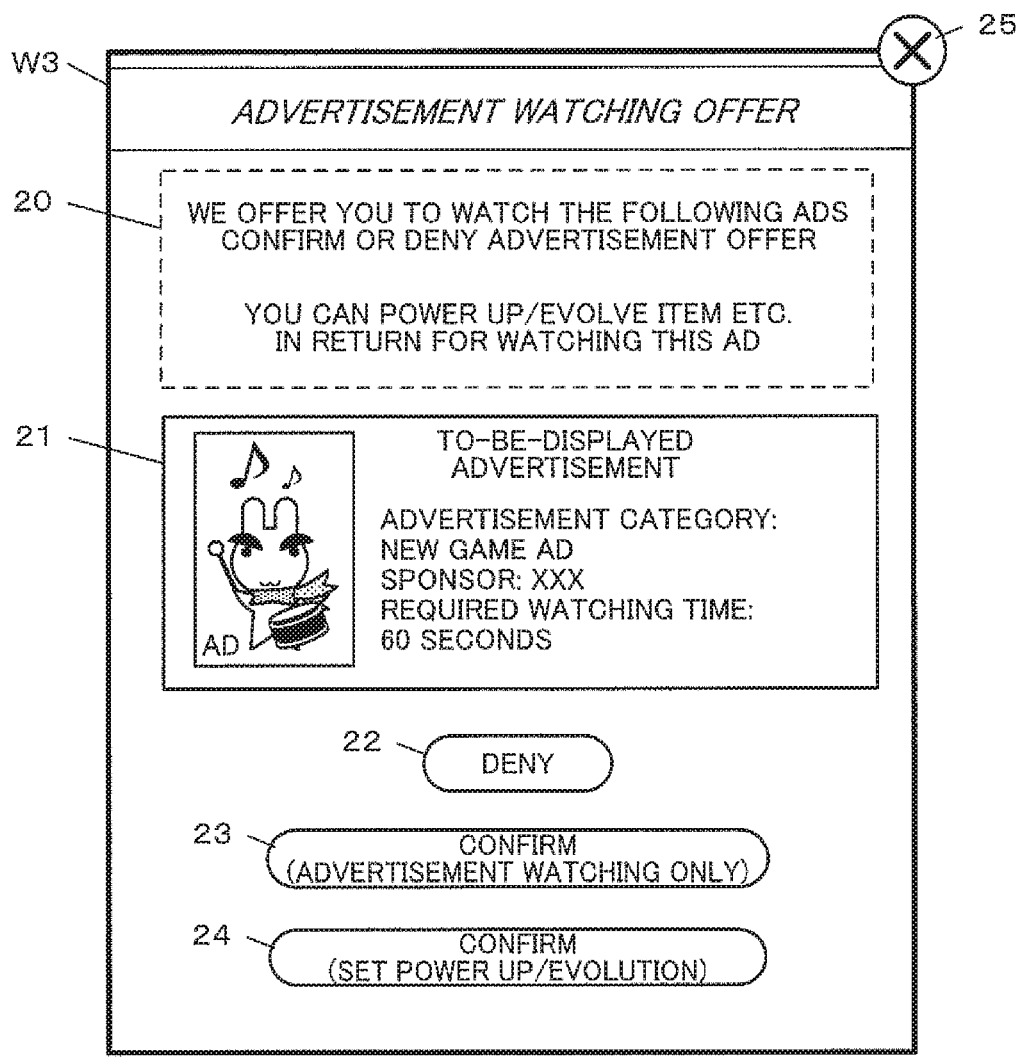
FIG. 4 is a diagram illustrating a display example of an advertisement offer screen.

When the timing at which the advertisement watching is possible is determined to have arrived, an advertisement offer screen W3 as illustrated in FIG. 4 for example is displayed on the user terminal 1500. The advertisement offer screen W3 is a screen for performing a confirmation operation for the advertisement watching, and includes a screen description 20, a to-be-watched advertisement description section 21, a watching denial operation icon 22, a first confirmation operation icon 23, a second confirmation operation icon 24, and a screen delete operation icon 25.

The screen description 20 is a section where guidance for an input operation on the screen is displayed. In the advertisement offer screen W3, the section provides description for instructing the player to input confirm/deny for the advertisement watching to be started, and description indicating that the item conversion setting, as a result of the advertisement watching confirmed, can be set.

The to-be-watched advertisement description section 21 is a section displaying simple information on an advertisement set to be the watching target. For example, a screen (a still image or a short movie) representing the advertisement, a category of the advertisement, information on the sponsor, information on required watching time are preferably displayed. Note that the information to be displayed can be appropriately selected from those described above, and may include information other than those described above.

The watching denial operation icon 22 is an icon operated for denying the advertisement watching offered.

The first confirmation operation icon 23 is an icon operated for performing the advertisement watching without the item conversion setting.

The second confirmation operation icon 24 is an icon operated for performing the advertisement watching and the item conversion setting.

The screen delete operation icon 25 is an icon operated for deleting the screen. The advertisement watching is regarded as being denied when the screen delete operation icon 25 is operated.

Figure 5:
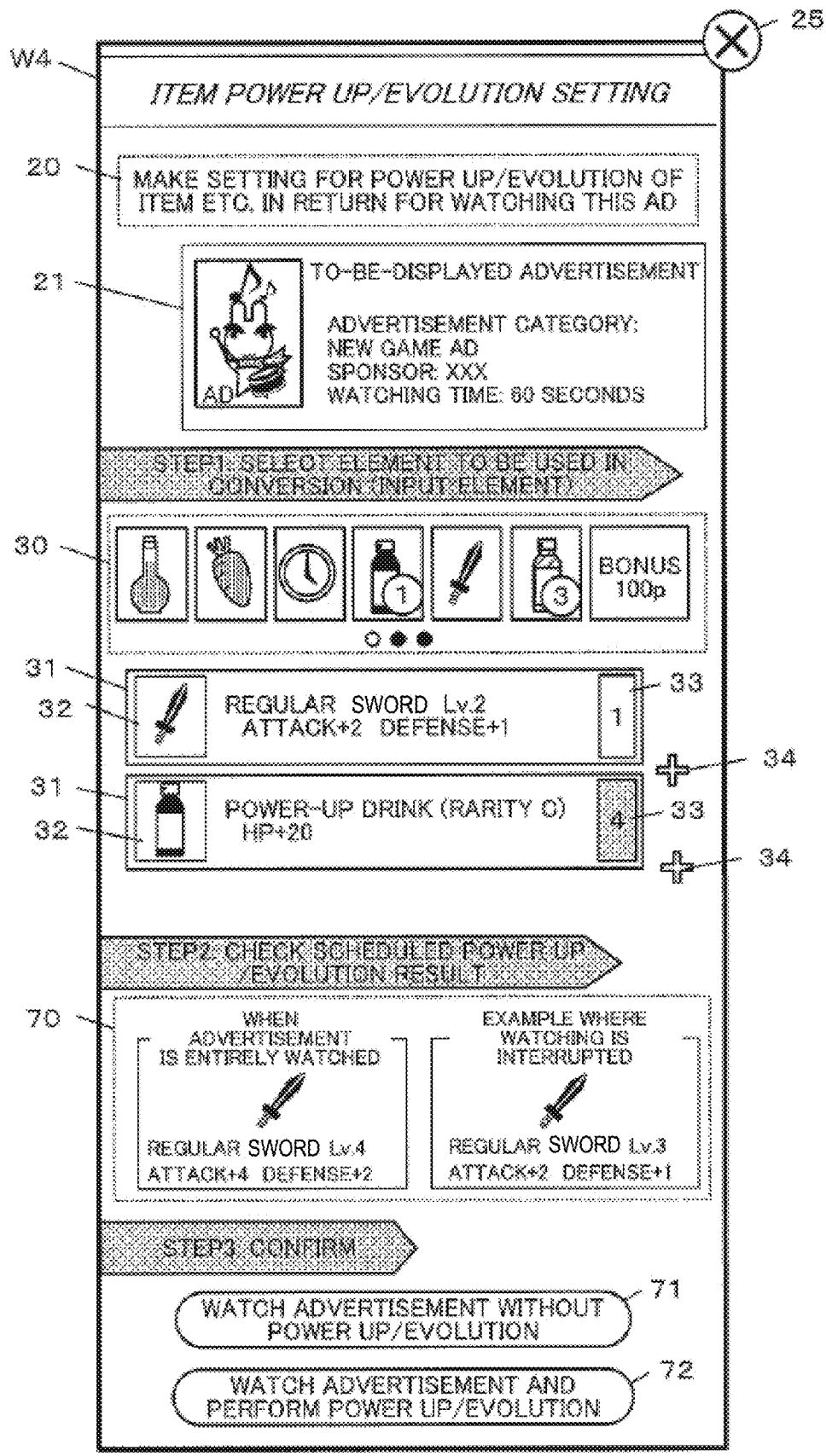
FIG. 5 is a diagram illustrating a display example of a setting screen according to a first embodiment.

When an operation on the second confirmation operation icon 24 is detected, a setting screen W4 as illustrated in FIG. 5 is displayed on the user terminal 1500.

The setting screen W4 according to the present embodiment includes the screen description 20, the to-be-watched advertisement description section 21, the screen delete operation icon 25, an input element option presenting section 30, an input element description section 31, a preview section 70 showing a preview of an item about to be obtained as the output element, a conversion skip operation icon 71, and a conversion execution operation icon 72.

The input element option presenting section 30 includes items, which are input element options, displayed side by side. The input element option presenting section 30 supports a scroll operation, and options other than those on the screen can be displayed by horizontally scrolling this section.

The input element description section 31 is prepared for each item currently set to be the input element, and provides simple information on the item. One input element description section 31 includes an image 32 of the item, a description on the name, rarity, ability setting value and the like of the item, an input quantity 33 set for the input element, and an input element adding operation icon 34.

In the present embodiment, the input element of the type selected first serves as the base of the power up/fusion. The input elements of the types selected thereafter are regarded as materials for powering up/evolving the base. FIG. 5 illustrates an example where two types of input elements have already been set. In this example, one "regular sword Lv2" is set as the base, and four "power up drink" are set as the materials.

In the present embodiment, any one type of the options is selected to be initially set as the input element serving as the base. Note that the player can perform a predetermined input element setting operation (for example, an operation of dragging and dropping an image of an option displayed in the input element option presenting section 30 into the input element description section 31) to select/designate a desired item to be the input element. A plurality of the same items can be set as the input element by repeating the same operations to update the input quantity 33. Another type of item can be additionally set by operating the input element adding operation icon 34 so that the input element description section 31 that has not been set is newly prepared for additionally selecting the input element.

The preview section 70 shows a preview of the result of the power up/evolution given to the player with the setting on the screen.

In the present embodiment, the user can stop/interrupt the advertisement watching. In such a case, the level of the improvement control, that is, the level of the power up/evolution is reduced based on the ratio of the actually watched time to the required watching time of the advertisement. For example, the ability level may improve from "2" to "4" when the ratio of the actually watched time to the required watching time is 100%. In such a case, when the ratio of the actually watched time to the required watching time is 50%, the level of the improvement is reduced so that the ability level only rises from "2" to "3". Thus, the preview section 70 according to the present embodiment displays information on the output element obtainable when the watching target advertisement is entirely watched, and information on the output element obtained when the watching is interrupted at the 50% completion point. The relationship between the ratio of the actual watched time and the reduction level is not limited to the example described herein, and can be set as appropriate in accordance with the content of the item set as the input element.

The conversion skip operation icon 71 is operated by the player who has input an operation for performing the advertisement watching involving the item conversion setting, on the advertisement offer screen W3, but changed his or her mind to perform the advertisement watching only.

The conversion execution operation icon 72 is for inputting an operation for performing the advertisement watching involving the item conversion with the setting on the setting screen reflected. When an operation on the conversion execution operation icon 72 is detected, the setting screen W4 is deleted and the advertisement watching starts. When the advertisement watching is completed or interrupted, the input element 10 selected and set on the setting screen W4 is converted (or may be referred to as consumed) to be the output element 14 given to the player (see FIG. 3). The output element 14 may be given with a parameter value of an ability associated with the input element 10 or data related to a display mode overwritten.

As used herein "the advertisement is entirely watched" means that a completion equivalent condition for the watching control is satisfied (a timing satisfying the condition has arrived). The concept of the timing at which the watching control ends includes a timing at which the advertisement watching has been technically completed. For example, a timing at which 30 seconds elapse after a 30-second movie advertisement has started to be displayed can be counted as the timing at which the watching control is completed, of course. Such an advertisement may include last 5 seconds involving fade out or a sponsor company logo being displayed until the end, and thus can be regarded as a scene after the displaying of the content of the advertisement has technically ended. In such a case, technically, the main portion of the advertisement has been completely presented at a point where 25 seconds have elapsed. Thus, the point is regarded as the watching control completed timing, and thus is regarded as a timing at which the completion equivalent condition is satisfied so that "advertisement is entirely watched".

[Functional Configuration]

Figure 6:
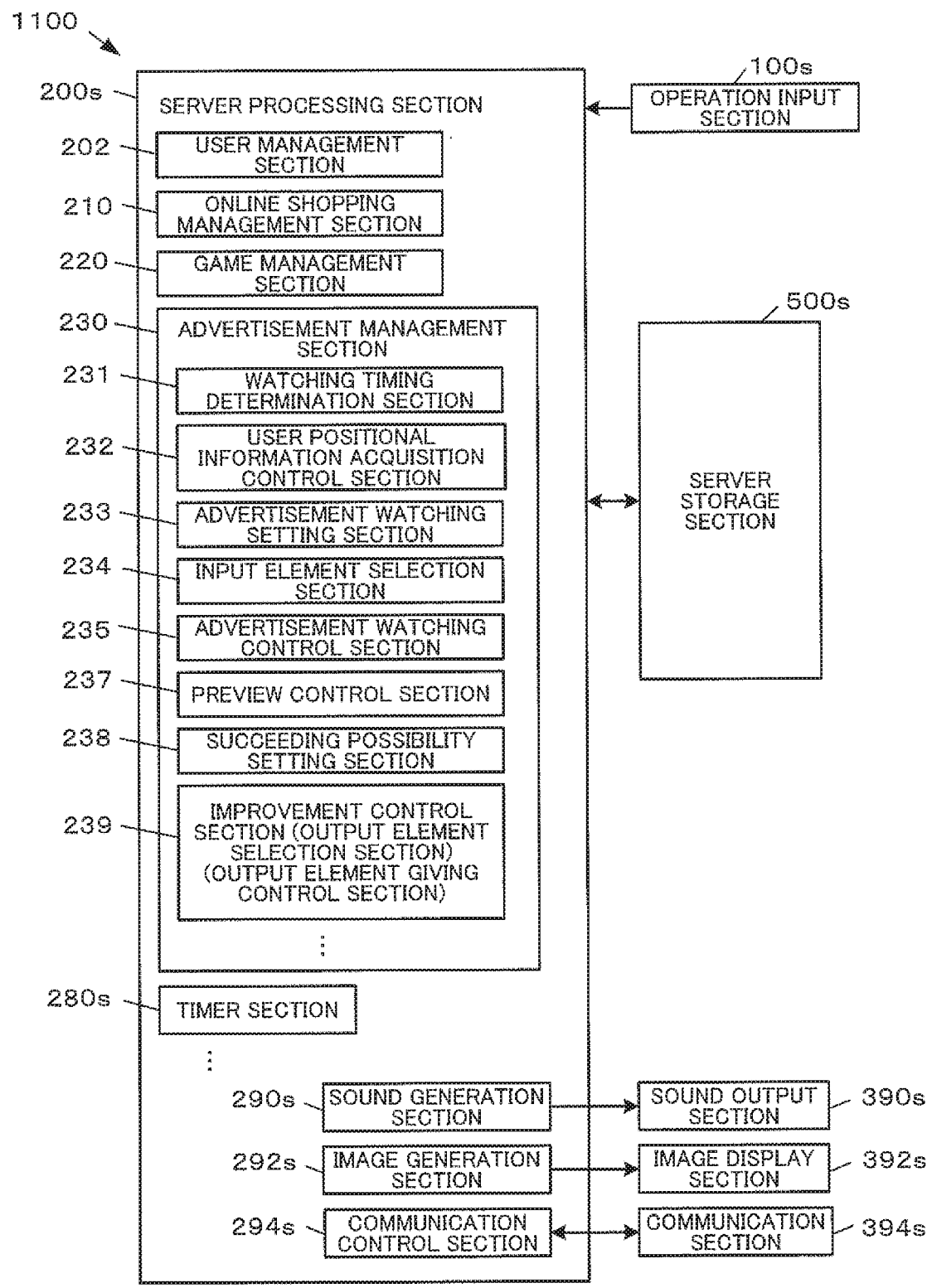
FIG. 6 is a functional block diagram illustrating an example of a functional configuration of a server system according to the first embodiment.

FIG. 6 is a functional block diagram illustrating an example of the functional configuration of the server system 1100 according to the present embodiment. The server system 1100 according to the present embodiment includes an operation input section 100s, a server processing section 200s, a sound output section 390s, an image display section 392s, a communication section 394s, and a server storage section 500s.

The operation input section 100s is for inputting various operations for management. The operation input section 100s corresponds to the keyboard 1106 in FIG. 1.

The server processing section 200s is implemented with electronic parts such as a processor (e.g., a CPU and a GPU), an ASIC, and an IC memory. The server processing section 200s controls data exchanged between functional sections including the operation input section 100s and the server storage section 500s, and performs various types of calculation processes based on a predetermined program, data, operation input signals from the operation input section 100s, data revived from the user terminal 1500, and the like to entirely control the operation of the server system 1100.

The server processing section 200s according to the present embodiment includes a user management section 202, an online shopping management section 210, a game management section 220, an advertisement management section 230, a timer section 280s, a sound generation section 290s, an image generation section 292s, and a communication control section 294s. Note that other functional sections other than these may be included as appropriate.

The user management section 202 performs a process related to a user registration procedure and manages the data of each user associated with an account (user ID). In the present embodiment, the user management section 202 has various functions including: 1) issuing an account to a registered user; 2) registration information management for registering and managing personal information for each account; 3) book keeping management for a payment medium consumed for paying for a charged element related to the game (for example, the gameplay, charged lottery, online shopping, and the like); and 4) play history management for managing login/logout history. Note that any other appropriate management function for other data associated with the account can be included.

The online shopping management section 210 is in charge of control related to the online shopping that is one of the charged elements, and can be implemented with a known online shopping technique as appropriate. In the present embodiment, the player can purchase player characters 4 (characters 4 as illustrated in FIG. 2), items 7 (see FIG. 2), an executable lottery ticket, an event participation ticket, and the like through online shopping. Any other elements may be set as appropriate to be sold in the online shopping. The online shopping management section 210 is in charge of performing a process for giving the bonus point.

The game management section 220 performs various processes related to gameplay management. The game according to the present embodiment is a client-server game, and thus the game management section 220 communicates with the user terminal 1500 to perform control for providing data required for the gameplay.

The advertisement management section 230 manages data on an advertisement, and performs output control for implementing advertisement watching, and control for item conversion in return for the advertisement watching (the power up/evolution of an item as defined in the present embodiment). Specifically, the advertisement management section 230 according to the present embodiment includes a watching timing determination section 231, a user positional information acquisition control section 232, an advertisement watching setting section 233, an input element selection section 234, an advertisement watching control section 235, a preview control section 237, a succeeding possibility setting section 238, and an improvement control section 239. Note that functional sections other than these may be included as appropriate.

The watching timing determination section 231 determines a timing at which the advertisement watching is possible.

The user positional information acquisition control section 232 performs control for acquiring the user positional information from the user terminal 1500. In the present embodiment, the user positional information and a request for the item conversion setting are acquired from the user terminal 1500, when the second confirmation operation icon 24 is selected and operated on the advertisement offer screen W3 (see FIG. 4). Alternatively, the user terminal 1500 may be requested to transmit the user positional information, when the request is received. Furthermore, a configuration may be employed where the user terminal 1500 periodically transmits the user positional information to the server system 1100, and the server system 1100 records and manages the user positional information in association with an account of the user. In such a configuration, the user positional information thus recorded and managed may be simply referred to.

The advertisement watching setting section 233 performs various watching settings related to the watching control including selecting an advertisement to be the target of the advertisement watching. In the present embodiment, at least one of a plurality of advertisements prepared is selected as the watching target, and the "watching setting" may be performed to set the output mode, the display size, the displayed position, and the like in accordance with the watching target advertisement.

The "watching setting" includes at least one of 1) setting on the length of time during which the watching target advertisement is output (for example required watching time), 2) setting on the output mode of the watching target advertisement, 3) timing setting including at least one of a timing in the game at which the watching target advertisement is output, date and time at which the watching target advertisement is output, an output timing such as a time zone in which the watching target advertisement is output, and the like.

In the present embodiment, time setting and the output mode setting set in advance for the advertisement, selected as the watching target advertisement, by the advertisement watching setting section 233 as well as the timing/date and time/time zone determined to be the watching possible timing by the watching timing determination section 231, and the like may be directly used.

The input element selection section 234 selects an input element from the entertainment elements, related to the game, possessed by the user (player). In other words, the input element is selected from a plurality of pieces of disposable information possessed by the user. In the present embodiment, 1) automatic search for the input element option, 2) control for displaying the advertisement offer screen W3 (see FIG. 4) on the user terminal 1500, 3) control for automatically setting one of the input elements options to be the input element as initial setting, and 4) control for setting the input element in accordance with the operation for selecting and designating the input element.

More specifically, the input element may be set with the input element selection section 234 selecting a first input element serving as the base (the "regular sword Lv. 2" in the example illustrated in FIG. 5) and an Nth input element (N being an integer equal to or larger than 2) (the "power up drink" in the example illustrated in FIG. 5) serving as the material. Furthermore, the input element can be selected from the entertainment elements with a valid period (described later) of the element to be selectable as the input element not expired yet, by referring to the valid periods associated with the entertainment elements.

The advertisement watching control section 235 performs advertisement watching control for achieving the "improvement control" in return for the advertisement watching. The improvement control include 1) improving ("power up" as defined in the present embodiment) a parameter value associated with the input element, or 2) improvement of the parameter value associated with the input element and change in the display mode of the input element ("evolution" as defined in the present embodiment).

The preview control section 237 shows a preview of the result of the power up/evolution that is the content of the improvement control. In the present embodiment, a preview of the output element to be given when the watching control is completed can be shown before the advertisement watching control is completed. This corresponds to display control for the preview section 70 on the setting screen W4 (see FIG. 5).

The succeeding possibility setting section 238 sets a succeeding possibility for the improvement control. In the present embodiment, the actual watched time between a point when the watching target advertisement starts to be watched and a point when the watching ends or is stopped is measured. Then, the ratio of the actual watched time to the required watching time of the watching target advertisement is obtained, and the succeeding possibility is set to be higher for a higher ratio. Specifically, the succeeding possibility is set to gradually increase toward the end of the watching control. The relationship between the ratio and the succeeding possibility is proportional in the present embodiment. Note that the relationship may be set to be stepwise or exponential as appropriate.

The improvement control section 239 executes the improvement control, which is the item conversion as defined in the present embodiment (power up/evolution of an item), when the watching control by the advertisement watching control section 235 is completed.

Specifically, the improvement control section 239 according to the present embodiment functions as an output element selection section. Specifically, the level of the improvement control may be changed and the output element may be tentatively determined based on at least one of the advertisement information, watching setting information, input element information, compatibility, and positional relationship. The preview control section 237 displays this tentative determination result. In this context, the improvement control section 239 can be regarded as functioning as a second preview control section.

The improvement control section 239 according to the present embodiment determines whether the improvement control succeeds, through a lottery process (a lottery with the winning possibility based on the succeeding possibility) using a random number generator, based on the succeeding possibility set by the succeeding possibility setting section 238. The improvement control is executed when the improvement control is determined to be a success. Furthermore, the improvement control, for the watching control for the watching target advertisement stopped before being completed, can be executed with a lower level compared with the improvement control for the watching control completed.

The timer section 280s uses a system clock to obtain the current date and time, a time limit, and the like.

The sound generation section 290s is implemented with an integrated circuit (IC) or by executing software that generates sound data and performs decoding, and generates or decodes sound data on a sound related to system management for the server system 1100 or related to the gameplay, background music (BGM), and a character voice. The resultant sound signal related to the system management is output to the sound output section 390s.

The sound output section 390s receives the sound signal to emit the corresponding sound, and corresponds to a speaker (not illustrated) of the main body device 1101 or the touch panel 1108 in the example illustrated in FIG. 1.

The image generation section 292s can generate an image related to the system management for the server system 1100, a game image (or data for displaying the game image on the user terminal 1500), and the like. The image related to the system management can be output to the image display section 392s.

The image display section 392s displays various images for system management based on the image signals input from the image generation section 292s. For example, the image display section 392s may be implemented with an image display device such as a flat panel display, a cathode-ray tube (CRT), a projector, or a head-mounted display. The image display section 392s corresponds to the touch panel 1108 in the example illustrated in FIG. 1.

The communication control section 294s performs a data process related to the data communications, and exchanges data with an external device through the communication section 394s. In the present embodiment, a process related to the data communications with the user terminal 1500 is performed.

The communication section 394s connects to the communication line 9 to implement communications. The communication section 394s is implemented with a transceiver, a modem, a terminal adapter (TA), a jack for a communication cable, a control circuit, and the like. The communication section 394s corresponds to the communication device 1153 in the example illustrated in FIG. 1.

The server storage section 500s stores a program and various types of data for implementing various function of the server processing section 200s for entirely controlling the server system 1100. The server storage section 500s is used as a work area for the server processing section 200s, and temporarily stores the results of calculations performed by the server processing section 200s based on various programs. The function of the server storage section 500s is implemented with an IC memory (e.g., RAM and ROM), a magnetic disk (e.g., hard disk), an optical disk (e.g., CD-ROM and DVD), an online storage, or the like. The server storage section 500s corresponds to a storage medium such as the IC memory 1152 and hard disk mounted in the main body device 1101 and the storage 1140 in the example illustrated in FIG. 1.

Figure 7:
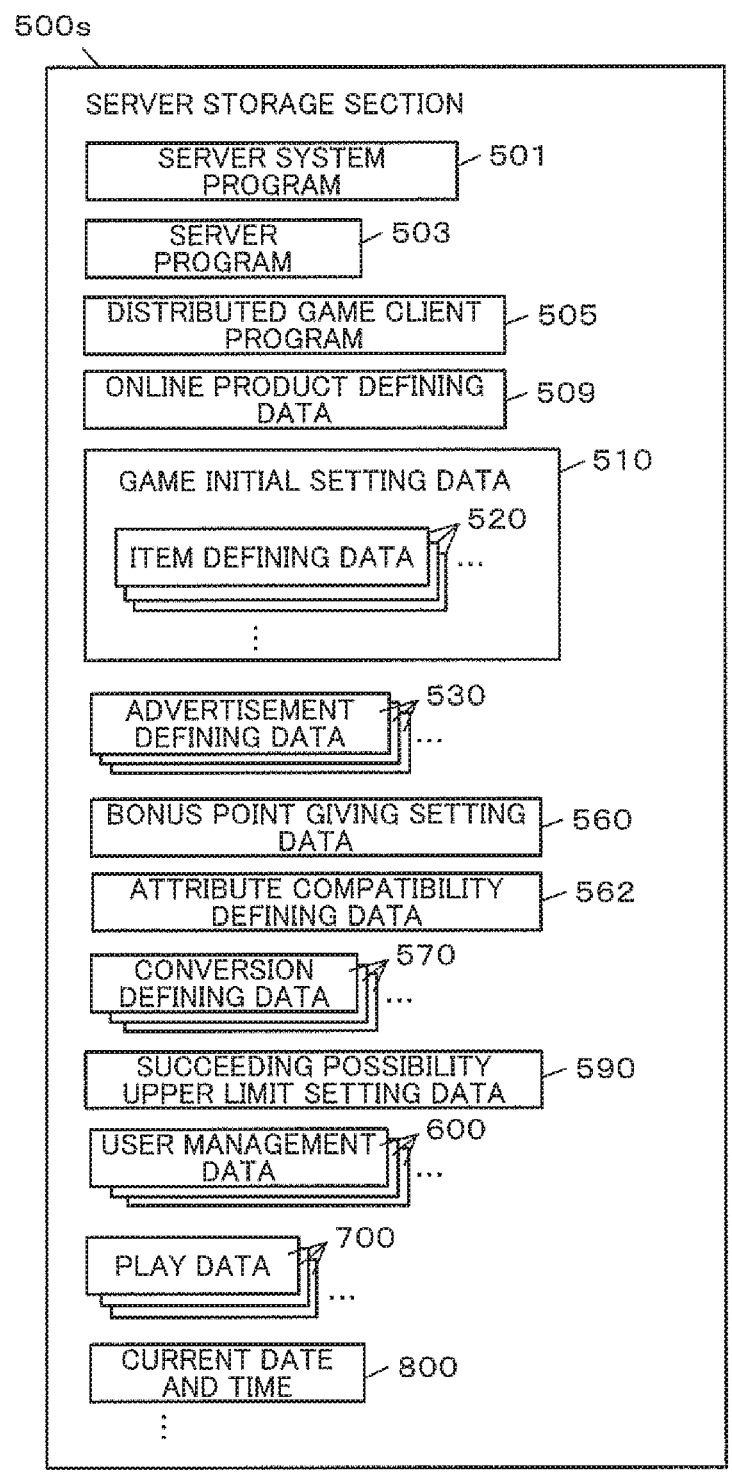
FIG. 7 is a diagram illustrating an example of a program and data stored in a server storage section according to the first embodiment.

FIG. 7 is a diagram illustrating an example of a program and data stored in the server storage section 500s according to the present embodiment. The server storage section 500s stores therein in advance, a server system program 501, a server program 503, a distributed game client program 505, an online product defining data 509, a game initial setting data 510, an advertisement defining data 530, a bonus point giving setting data 560, an attribute compatibility defining data 562, a conversion defining data 570, and a succeeding possibility upper limit setting data 590.

The server storage section 500s stores data, sequentially generated and managed, including user management data 600, play data 700, and current date and time 800. Furthermore, the server storage section 500s may store information on a timer, a counter, various flags, and the like as appropriate.

The server system program 501 is read out and executed by the server processing section 200s for causing the server system 1100 to implement a basic input/output function required for a computer.

The server program 503 is read out and executed by the sever processing section 200s for implementing functions of the user management section 202, the online shopping management section 210, the game management section 220, and the advertisement management section 230 (see FIG. 6).

The distributed game client program 505 is an original of a game client program provided to the user terminal 1500.

The online product defining data 509 is data defining a product purchasable through the online shopping implemented with the online shopping management section 210 (see FIG. 6). One online product defining data 509 includes a unique product type (for example, an item type or the like), a purchasing cost, a quantity given, and a product category associated with each other. It is a matter of course that information other than these may be included as appropriate.

The game initial setting data 510 includes various types of initial setting data, defining data, and the like for executing the game according to the present embodiment. In the present embodiment, the game initial setting data 510 includes item defining data 520.

Figure 8:
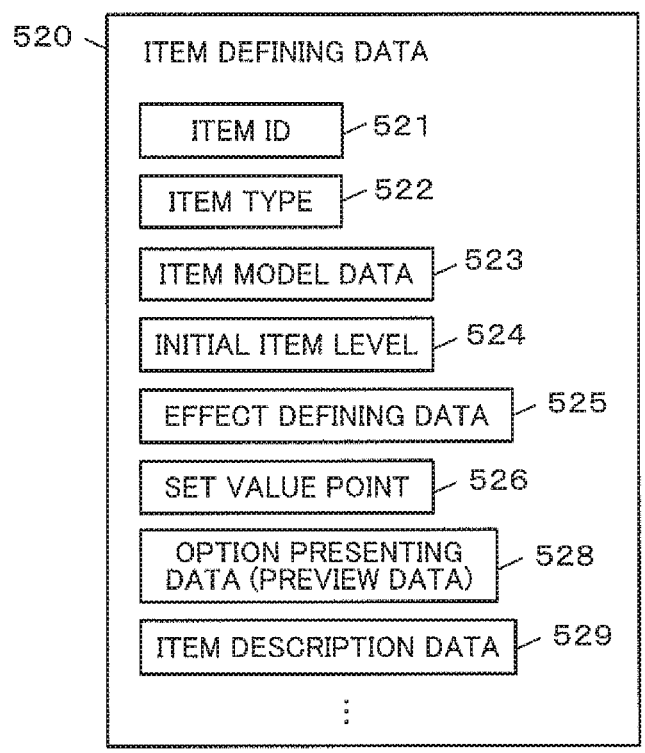
FIG. 8 is a diagram illustrating an example of a data structure of item defining data.

The item defining data 520 is prepared for each item type, and includes various types of defining data related to the item. One item defining data 520 includes, as illustrated in FIG. 8 for example, 1) an item ID 521 that is unique identification information on the item,
2) an item type 522,
3) item model data 523 for depicting the item in the game,
4) an initial item level 524 indicating an initial status of the item,
5) effect defining data 525 defining the effect of the item,
6) a set value point 526 of the item,
7) option presenting data 528 for presenting the item on the input element option presenting section 30 on the setting screen W4 (see FIG. 5) or displaying the preview section 70,
8) item description data 529 for displaying information indicating that the item is set as the input element and description on the input element on the input element description section 31.

Note that data other than these can be included as appropriate.

Figure 9:
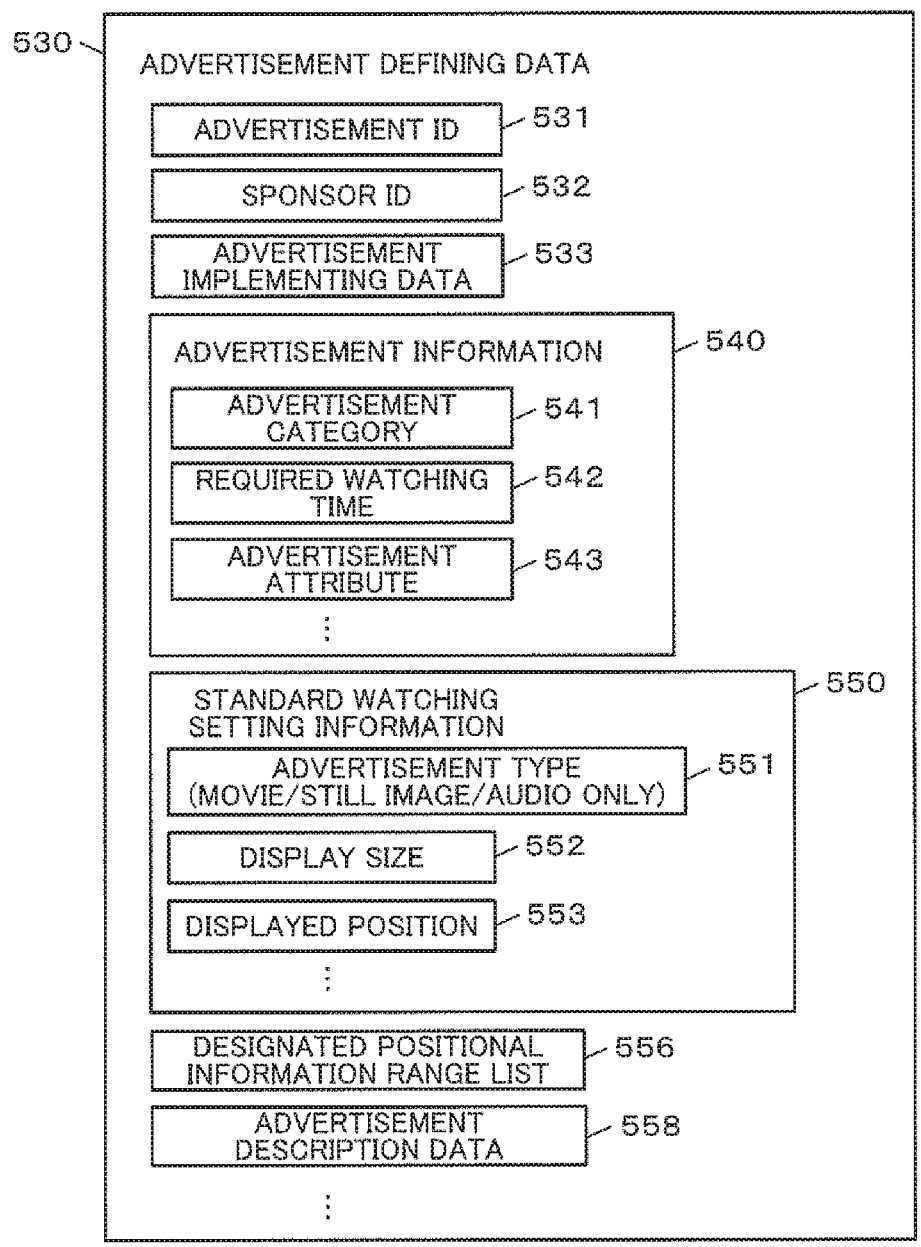
FIG. 9 is a diagram illustrating an example of a data structure of advertisement defining data.

Referring back to FIG. 7, the advertisement defining data 530 is prepared for each advertisement. For example, as illustrated in FIG. 9, one advertisement defining data 530 includes an advertisement ID 531 serving as unique identification information on the advertisement, a sponsor ID 532 for identifying the sponsor of the advertisement, advertisement implementing data 533 as an entity for implementing the advertisement watching, advertisement information 540, standard watching setting information 550, designated positional information range list 556, and advertisement description data 558.

The advertisement implementing data 533 may be movie data still image data, and sound data, and thus is not limited to any particular data format.

The advertisement information 540 is additional information related to the advertisement. In the present embodiment, the advertisement information 540 includes an advertisement category 541 based on the content of the advertisement, required watching time 542, and a given advertisement attribute 543. Note that data other than these can be included as appropriate. The type of the advertisement attribute 543 can be set as appropriate and may be set to be three attributes including "fire", "water", and "wood", for example.

The standard watching setting information 550 includes a setting value for a standard setting watching environment for watching the advertisement. In the present embodiment, the standard watching setting information 550 includes an advertisement type 551 that is any one of a movie, a still image, and audio only, a display size 552, and a displayed position 553. Note that data other than these can be included as appropriate.

The designated positional information range list 556 is data defining a geographic condition associated with the advertisement, and is compared with a coordinate system of the user positional information acquired by the position measurement module 1555 of the user terminal 1500. Specifically, one or a plurality of ranges of GPS coordinates are set. Note that this information may not be set.

The advertisement description data 558 includes an image, a text, sound data, or the like for describing an overview of the advertisement corresponding to the defining data. In the present embodiment, the advertisement description data 558 is used for displaying the to-be-watched advertisement description section 21 on the advertisement offer screen W3 (see FIG. 4) and the setting screen W4 (see FIG. 5) or for the other like purposes.

Referring back to FIG. 7, the bonus point giving setting data 560 is data in which a condition for giving the bonus point and an amount of the point thus given is defined in association with each other. For example, one or a plurality of sets of data pieces are stored, with each set including two types of data which are the giving condition "bulk purchase, quantity: 5, online shopping" and the given point amount "5 points". Note that this data may not be set.

The attribute compatibility defining data 562 is data defining the type of the item that can be the input element and compatibility relative to the advertisement attribute. The type of the compatibility may be set as appropriate and may include "no compatibility".

Figure 10:
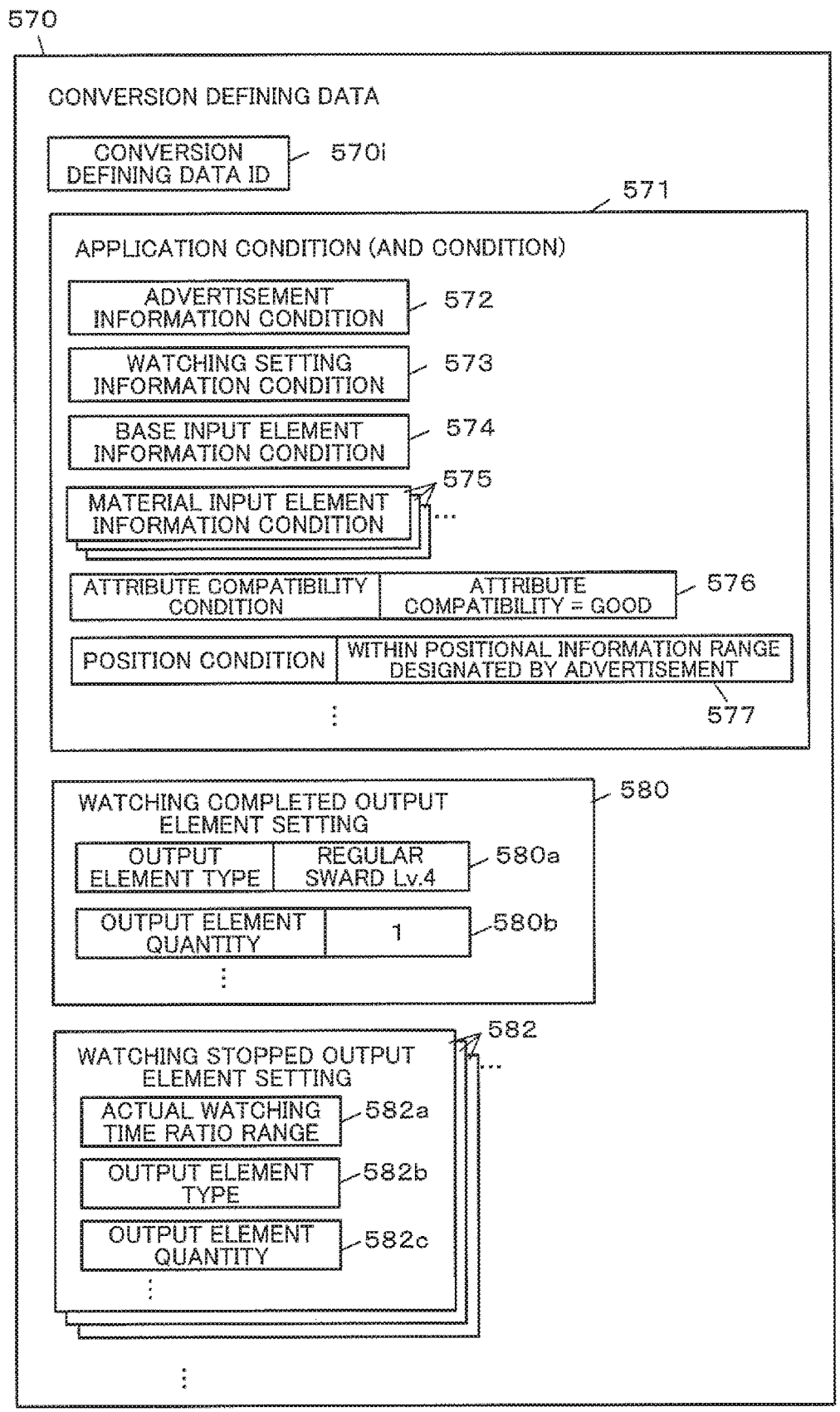
FIG. 10 is a diagram illustrating an example of a data structure of conversion defining data.

The conversion defining data 570 is data defining a pattern of conversion from the input element to the output element. For example, as illustrated in FIG. 10, one conversion defining data 570 includes a conversion defining data ID 570*i* that is unique identification information on the defining data, an application condition 571, a watching completed output element setting 580, and a watching stopped output element setting 582. Note that data other than these can be included as appropriate.

The application condition 571 defines a requirement for applying the defining data. In the present embodiment, the application condition 571 includes an advertisement information condition 572, a watching setting information condition 573, a base input element information condition 574, a material input element information condition 575, an attribute compatibility condition 576, and a position condition 577. The application condition 571 according to the present embodiment is defined as an AND condition of the advertisement information condition 572 to the position condition 577. Note that the advertisement information condition 572 to the position condition 577 may be selected to be not set, meaning that the condition is "not required".

The advertisement information condition 572 defines a requirement related to the watching target advertisement. For example, as illustrated in FIG. 11, the advertisement information condition 572 is defined as an AND condition including:

1) an advertisement ID condition 572*a* in which a list of advertisement IDs corresponding to predetermined advertisement is set, 2) a category condition 572*b* in which a list of predetermined categories for the content of the advertisement is set, 3) a sponsor condition 572*c* in which a list of sponsors on predetermined advertisements is set, 4) a required watching time condition 572*d* in which a range of the required watching time of the advertisement is set, 5) a same advertisement watched times condition 572*e* that is a condition for the number of watched times of the watching target advertisement, in which a range of watched times including the current watched time or the past watched times is set. The advertisement ID condition 572*a* to the same advertisement watched times condition 572*e* may be selected to be "not set".

Note that the advertisement information condition 572 may include conditions other than the items described above as appropriate.

With the advertisement information condition 572 set as appropriate, the content of the item conversion, that is, the level of the improvement control such as item power up/evolution can be changed in accordance with which one of the advertisements is watched. Thus, the content of the conversion can be differentiated. Specifically, for example, a special output element may be provided when a predetermined advertisement, a predetermined advertisement category, or an advertisement of a predetermined sponsor is watched. Furthermore, differentiation such as providing a more valuable output element for advertisement watching involving longer required watching time can be achieved. Furthermore, differentiation such as providing a more valuable (less valuable) output element to a player watching the same advertisement over and over again can be achieved.

Referring back to FIG. 10, the watching setting information condition 573 defines a requirement related to watching setting. In the present embodiment, as illustrated in FIG. 12 for example, the watching setting information condition 573 is defined as an AND condition including an advertisement type condition 573*a*, a size condition 573*b*, a displayed position condition 573*c*, a timing condition 573*e*, a watched date condition 573*f*, and a watched time zone condition 573*g*.

The advertisement type condition 573*a* defines the type of an output mode of the advertisement. In the present embodiment, any one of a movie, a still image, and audio only is set. With the condition appropriately set, an output element with a higher value can be set depending on the type of the advertisement, that is, in the order of audio only<still image<movie. Thus, the level of the improvement control, such as the item power up/evolution, can be changed based on the advertisement type.

The size condition 573*b* defines the type of the size of the displayed advertisement occupying the screen of the touch panel 1506 of the user terminal 1500. In the present embodiment, any one of large, medium, and small is set. Note that the types other than these may be set as appropriate. The size may be defined with a list of ranges of occupancy rate. With the condition appropriately set, an output element with a higher value can be set for a larger advertisement display size, that is, in the order of small<medium<large. Thus, the level of the improvement control, such as the item power up/evolution, can be changed based on the display size of the advertisement.

The displayed position condition 573*c* defines the position of an advertisement displayed on the screen of the touch panel 1506 of the user terminal 1500. In the present embodiment, any one of a screen upper portion, a screen center portion, a screen lower portion is set. Note that the types other than these may be set as appropriate. The position may be defined as a range of positional coordinates of a representative point of the advertisement displayed. With the condition appropriately set, a more valuable output element may be set for a displayed position of an advertisement more noticeable by the player, that is in the order of the screen lower portion<the screen upper portion<and the screen center portion. Specifically, the level of the improvement control, such as the item power up/evolution, can be changed based on the advertisement display.

The timing condition 573*e* is a condition defining a situation of outputting an advertisement after the game has started. One or a plurality of timings at which the advertisement watching is possible can be selected. The game according to the present embodiment is an ARPG. Thus, for example, such a timing, during the gameplay, is preferably set to be during a movement within a map, while data on the next map is being loaded, when entering a dungeon from the map, when a battle has ended, when a stage is finished, and the like. Such a timing, before the gameplay, is preferably set to be while a menu is being displayed, while data is being loaded, during online shipping, and the like. Such a timing, after the gameplay, may be set to be while checking the result, while checking the ranking, and the like. Note that the condition may include "not set". In the timing condition 573*e*, one or a plurality of the timings described above are set. Thus, the level of the improvement control, such as the item power up/evolution, can be changed based on the timing at which the advertisement can be output.

The watched date condition 573f is a condition related to the date when the watching is performed, and defines a predetermined date, or a range of months and dates. With the condition appropriately set, a special output element may be set to be the predetermined date or a predetermined period. Thus, the level of the improvement control, such as the item power up/evolution, can be changed based the date on which the advertisement is watched.

The watched time zone condition 573g is a condition related to a time zone in which an advertisement is watched, and at least one of a time range, such as "0:00 to 3:00" for example, is set. With the condition appropriately set, a special output element may be set for a certain time period. Thus, the level of the improvement control, such as the item power up/evolution, can be changed based on the time zone in which the advertisement is watched.

Any one of the advertisement type condition 573a to the watched time zone condition 573g may be selected to be "not set". Note that the watching setting information condition 573 may include conditions other than the items described above as appropriate.

Figure 13:
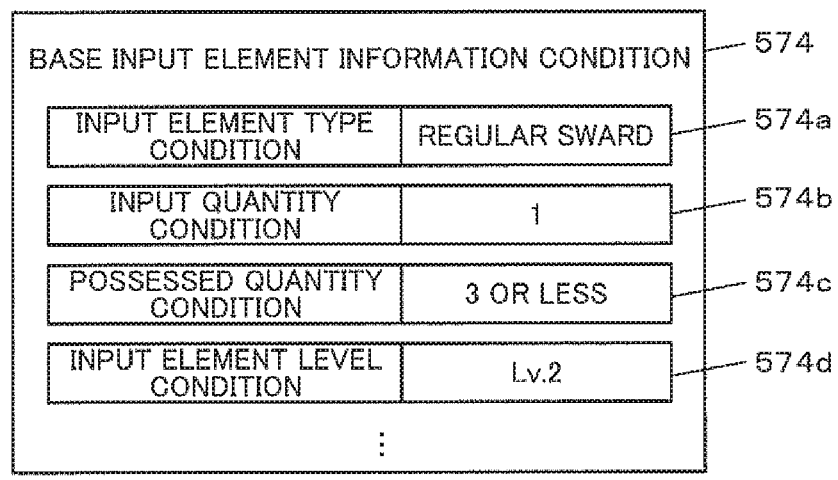
FIG. 13 is a diagram illustrating an example of a data structure of a base input element information condition.

Referring back to FIG. 10, the base input element information condition 574 defines a requirement related to the input element serving as the base. As illustrated in FIG. 13 for example, in the present embodiment, the condition is set as an AND condition including:

1) an input element type condition 574a in which at least one type of the input element serving as the base is set;

2) an input quantity condition 574b in which a range of quantities of such input element is set;

3) a possessed quantity condition 574c in which a range of quantities of the input element, serving as the base, possessed by the player is set; and 4) an input element level condition 574d related to the quality and the level (the level indicating the level of growth of an item in the present embodiment) of the input element serving as the base. Any one of the input element type condition 574a to the input element level condition 574d may be selected to be "not set". Note that the base input element information condition 574 may include conditions other than the items described above as appropriate.

Figure 14:
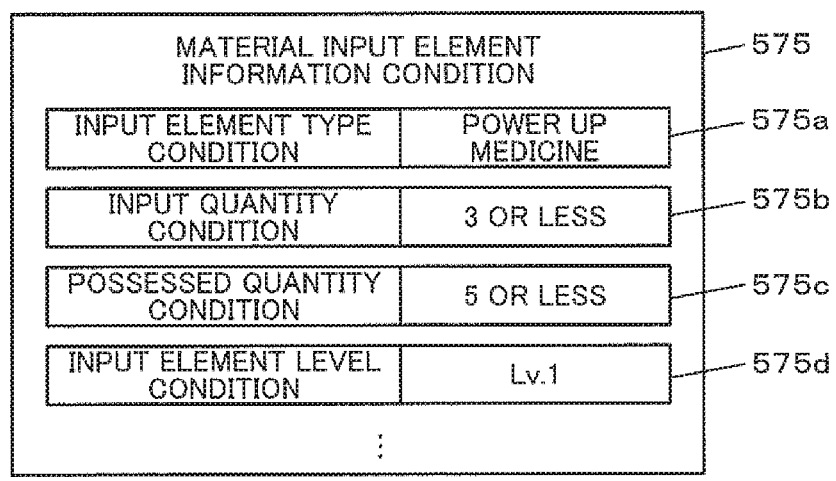
FIG. 14 is a diagram illustrating an example of a data structure of a material input element information condition.

Referring back to FIG. 10, the material input element information condition 575 defines a requirement for the input elements serving as the material. For example, as illustrated in FIG. 14, in the present embodiment, the condition is an AND condition including:

1) an input element type condition 575a in which at least one type of an input element serving as a material is input;

2) an input quantity condition 575b in which a range of quantities of the input element is set;

3) a possessed quantity condition 575c in which a range of quantities of the input element, serving as the element, possessed by the player; and 4) an input element level condition 575d that is a condition related to the quality and status (a level of growth rate of an item in the present embodiment) of the input element serving as the material. Any one of the input element type condition 575a to the input element level condition 575d may be set to be "not set". Note that a condition other than these items can be included in the material input element information condition 575 as appropriate.

Referring back to FIG. 10, the attribute compatibility condition 576 defines a requirement related to the compatibility between the advertisement and the input element serving as the base. In the present embodiment, any one of three types of compatibility (good, normal, and bad) is set. The number of types of the compatibility can be set as appropriate.

The position condition 577 defines a requirement related to the relationship between positional information associated with the watching target advertisement (the designated positional information range list 556 in the present embodiment (see FIG. 9)) and the user positional information. In the present embodiment, the condition is set to be any one of within/outside a range defined in the designated positional information range list 556 and not set. A specific relative distance range may be set.

The watching completed output element setting 580 defines the output element given to the player who has entirely watched the watching target advertisement. In the present embodiment, the setting includes an output element type 580a and an output element quantity 580b.

The watching stopped output element setting 582 defines an output element given to the player when the watching target advertisement is stopped to be output partway and thus is not entirely watched.

One watching stopped output element setting 582 includes an actual watching time ratio range 582a that is a condition for a ratio of actual watching time, between the watching start and the watching end, to the required watching time of the watching target advertisement, an output element type 582b, and an output element quantity 582c. Basically, the output element type 582b and the output element quantity 582c, in the watching stopped output element setting 582, are set to be inferior to the watching completed output element setting 580 in the quality and the quantity. In other words, the watching stopped output element setting 582 serves as defining data for executing improvement control, when the watching control for the watching target advertisement is stopped before being completed, with a level lower than that of the improvement control in a case of the watching control for the watching target advertisement entirely watched.

As described above, in the present embodiment, the watching completed output element setting 580 and the watching stopped output element setting 582 are defined with the type and the quantity of the output element. Specifically, even in a case where the item conversion corresponds to the "power up" for the input element on the game setting, the entertainment element serving as the output element is distinguished from the entertainment element serving as the input element, on internal data. This is because the system is designed to enable a slight change in the outer view of the input element, as a result of the power up, displayed on the game screen in such a manner that the power up can be recognized. If the item conversion corresponding to "power up" on the game setting requires no change in the outer view, the watching completed output element setting 580 and the watching stopped output element setting 582 may define a change target parameter type, indicating which one of the parameter values associated with the input element is changed, and the changed amount.

Referring back to FIG. 7, the succeeding possibility upper limit setting data 590 sets an upper limit value of the succeeding possibility related to whether the item conversion succeeds or fails in various situations. Specifically, the upper limit value of the succeeding possibility is set for each of a combination among the advertisement information condition 572, the watching setting information condition 573, the attribute compatibility condition 576, and the position condition 577 in the conversion defining data 570.

The user management data 600 is prepared for each registered user, that is, for each player, and includes various types of data associated with the user account. In other words, the user management data 600 is first play information on a player related to a game.

Figure 15:
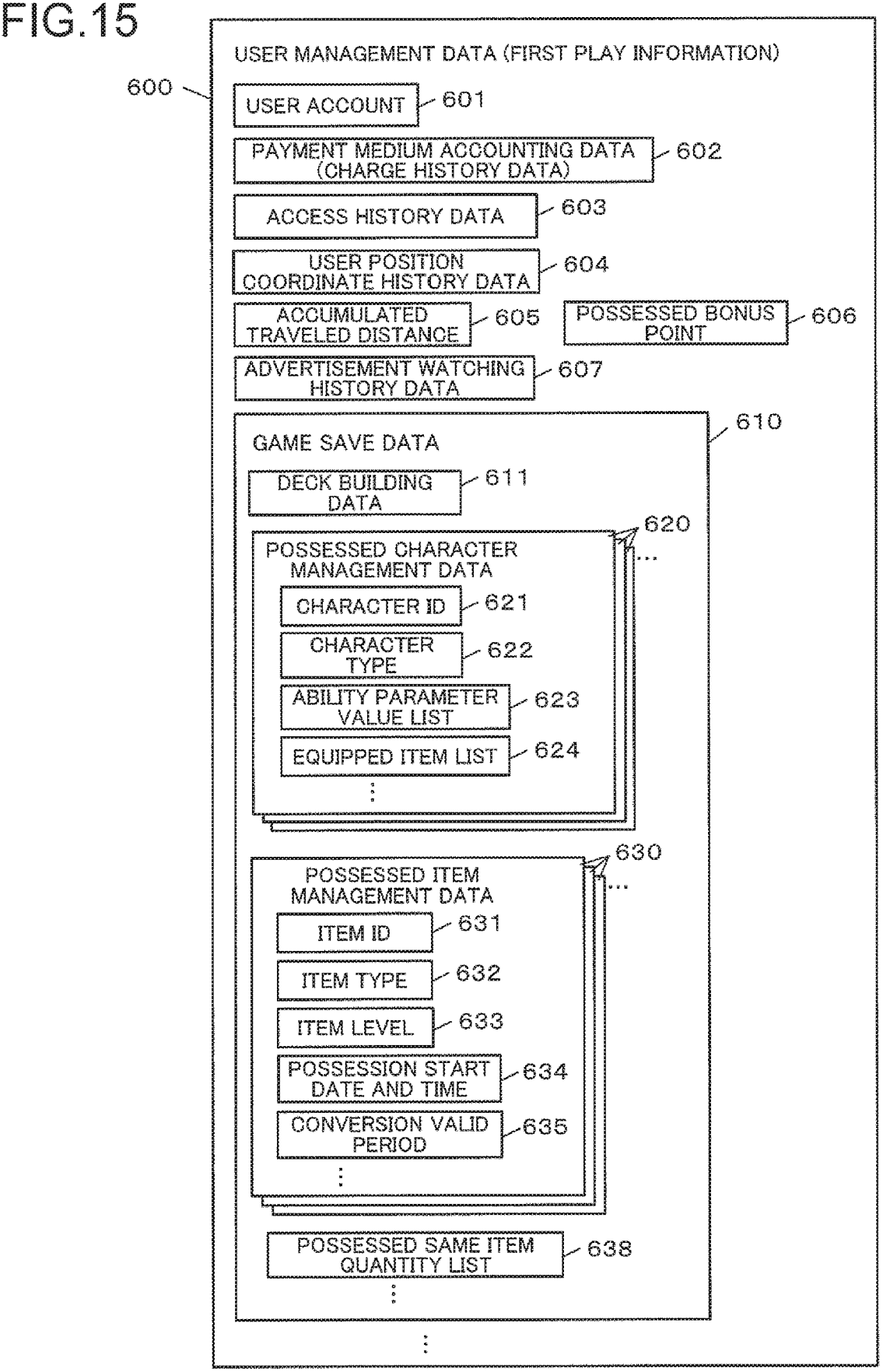
FIG. 15 is a diagram illustrating an example of a data structure of user management data.

For example, as illustrated in FIG. 15, one user management data 600 includes a unique user account 601, payment medium accounting data 602, access history data 603, user position coordinate history data 604, an accumulated traveled distance 605, a possessed bonus point 606, advertisement watching history data 607, and game save data 610. Note that data other than these can be included as appropriate.

The payment medium accounting data 602 serves as what is known as an account book storing therein information on a charged/consumed amount of the payment medium associated with the user, information on a reason for the charging/consumption, and information on changed date and time in association with each other. The payment medium accounting data 602 can also be referred to as charge history data or charge information.

The access history data 603 is data in which the past game played timings are stored in series, and is automatically updated at a login/logout timing.

The user position coordinate history data 604 is a history of user positional coordinates. In the present embodiment, the data is updated with the user positional information automatically acquired at any appropriate timing from the user terminal 1500.

The accumulated traveled distance 605 includes an accumulated distance traveled by the player holding the user terminal 1500 with at least a program for implementing the game activated. When the traveled distance is used and consumed for the power up and the like of a character, an item, and the like, the accumulated traveled distance 605 is decremented by an amount corresponding to the used/consumed amount.

The possessed bonus point 606 includes the amount of bonus points that have been obtained but not used by the player. When the bonus point is used and consumed for the power up/evolution of a character, an item, or the like, the possessed bonus point 606 is decremented by an amount corresponding to the used/consumed amount.

The advertisement watching history data 607 stores an advertisement ID of an advertisement watched by the player and watched date and time in association with each other.

The game save data 610 includes various types of data indicating the game progress status at the previous gameplay. In the present embodiment, the data includes deck building data 611, possessed character management data 620, possessed item management data 630, and a possessed same item quantity list 638. Note that data other than these can be included as appropriate.

The deck building data 611 is data for defining a group of characters selected by the player for the gameplay, from the possessed characters.

The latest state of each of the characters possessed by the player is recoded and managed by the possessed character management data 620. One possessed character management data 620 includes a character ID 621 serving as unique identification information on the character, a character type 622, an ability parameter value list 623, and an equipped item list 624. Note that data other than these can be included as appropriate.

The possessed item management data 630 is prepared for each item possessed by the player. One possessed item management data 630 includes an item ID 631, an item type 632, an item level 633, possession start date and time 634, and a conversion valid period 635. Note that information other than these, such as information on a history of equipping by the character for example may be included as appropriate.

The conversion valid period 635 indicates a period in which the item can be set to be the input element to be converted. For example, in the present embodiment, the period is automatically managed to be set as a predetermined period after data updating. For example, the item level 633 may be improved with a date and time after two weeks from the possession start date and time 634 set to be the first conversion valid period 635. Alternatively, data on a history of equipping by the character may be provided to the possessed item management data 630. When the history data is updated, the conversion valid period 635 may be updated (extended) to be date and time after two weeks from the point where the history data is updated. The conversion valid period 635 may be set to be a predetermined value indicating "no expiration" or "indefinite".

The possessed same item quantity list 638 is a list of quantities of the possessed items with different item IDs 631 and with the same item type 632, and is automatically updated each time the items, obtained by the player, increase or decrease (obtained, consumed, abandoned, and the like).

Referring back to FIG. 7, the play data 700 is prepared for each player (in other words, each user terminal 1500) and includes various types of data describing a control status and the like of the game program according to the present embodiment. In other words, the play data 700 is second play information on the player related to the game, and serves as game implementation status management data.

Figure 16:
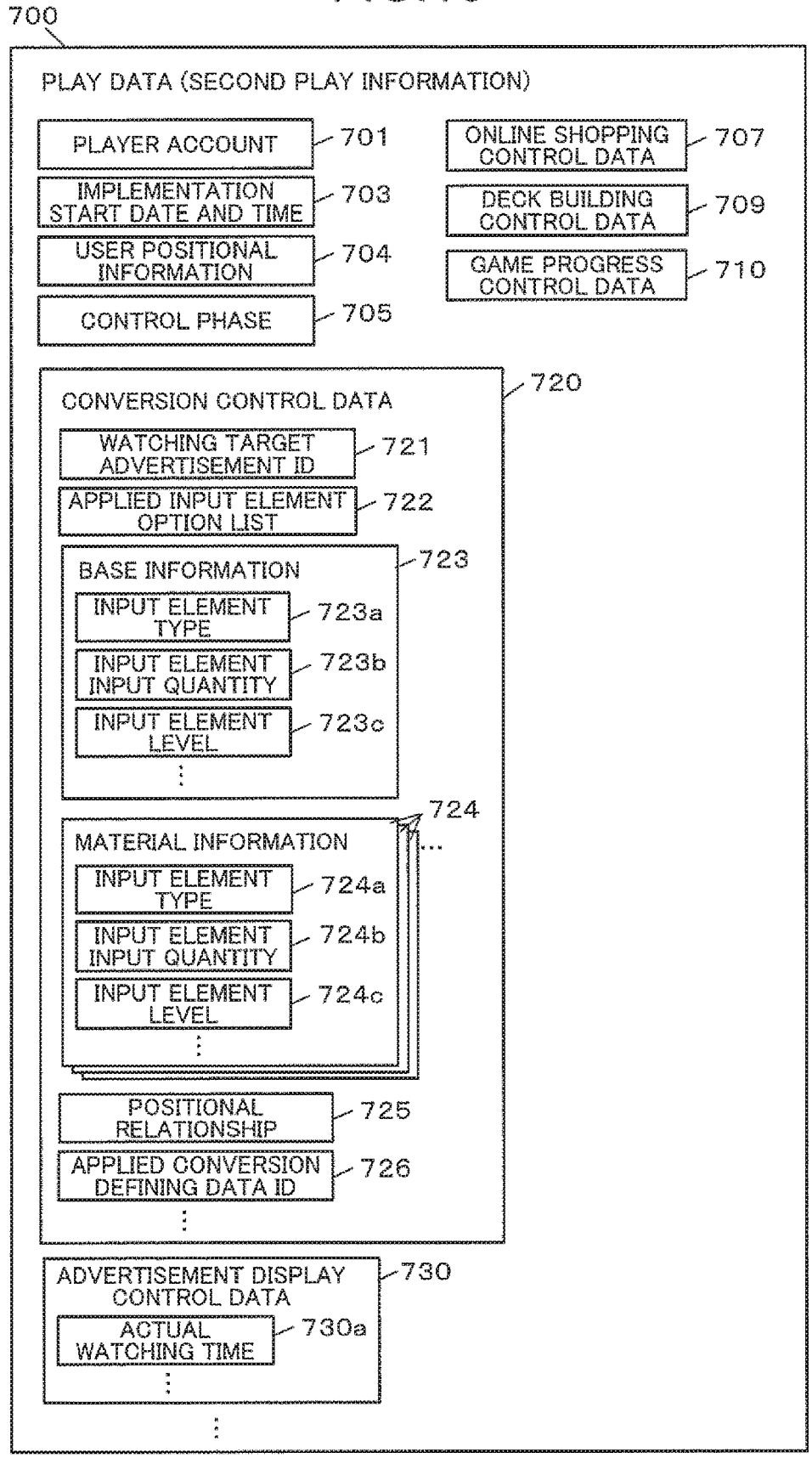
FIG. 16 is a diagram illustrating an example of a data structure of play data.

Specifically, one play data 700 includes a player account 701 including a user account of a player allocated with the data, implementation start date and time 703, user positional information 704, and a control phase 705 for example, as illustrated in FIG. 16.

The control phase 705 is information indicating rough categories of the implementation status (or control status). In the present embodiment, the phase is set to be any one of a display status of a menu displayed after login, during online shopping selected and implemented from the menu, during deck building selected and implemented from the displayed menu, during the gameplay selected and implemented from the menu, while result checking after the game is terminated or selected and implemented from the menu, and the like. Note that the category of the control phase is not limited to these, and other categories may be added or any of those described above may be omitted as appropriate in accordance with the content of the game or the system design.

The play data 700 has various types of control data generated/updated as appropriate, for storing specific control data for each control phase. In the present embodiment, the data includes online shopping control data 707, deck building control data 709, and game progress control data 710.

The game progress control data 710 includes various types of data that are generated when the gameplay starts and describe gameplay progress statuses. The content of the game progress control data 710 can be set as appropriate in accordance with the content of the game. For example, the data includes an ongoing progress unit indicating a game progress unit (for example, a stage, a scenario, a map, time in the game world, and the like) in the gameplay, a finished progress unit list including finished ones of the game progress units, an event occurrence history, information on a current position of each player character or enemy character in the game space, an ability parameter value list, and the like. Note that data other than these can be included as appropriate. For example, the name of a song in a played game, a game difficulty setting, and the like may be included as appropriate in accordance with the detail of the game.

The play data 700 includes conversion control data 720 related to the item conversion from the input element to the output element in return for the advertisement watching and advertisement display control data 730 related to control for the advertisement display.

The conversion control data 720 according to the present embodiment includes a watching target advertisement ID 721 that is information for identifying the watching target advertisement, an applied input element option list 722, base information 723, material information 724, positional relationship 725, and applied conversion defining data ID 726. Note that data other than these can be included as appropriate.

The applied input element option list 722 includes options of information to be displayed in the input element option presenting section 30 on the setting screen W4 (see FIG. 5).

The base information 723 is a set of information on the input element serving as the base. In the present embodiment, this information includes an input element type 723a, an input element input quantity 723b, and an input element level 723c. The input element type 723a and the input element level 723c are respectively copies of the item type 632 and the item level 633 in the possessed item management data 630 (see FIG. 15) on the item.

The material information 724 is a set of information prepared for each input element serving as the material. In the present embodiment, one material information 724 includes an input element type 724a, an input element input quantity 724b, and an input element level 724c. The input element type 724a and the input element level 724c are respectively copies of the item type 632 and the item level 633 in the possessed item management data 630 (see FIG. 15) on the item.

The applied conversion defining data ID 726 includes a conversion defining data ID 570i of the defining data 570 applied to the current item conversion, in a plurality of pieces of the conversion defining data 570 (see FIG. 7 and FIG. 10). The preview section 70 in the setting screen W4 (see FIG. 5) is displayed based on the output element type 580a and the output element quantity 580b in the watching completed output element setting 580 in the conversion defining data 570 corresponding to the ID.

The advertisement display control data 730 includes information related to the advertisement output control based on the advertisement implementing data 533 (see FIG. 9). In the present embodiment, the data includes actual watching time 730a the counting of which starts when the watching starts and stops when the watching is completed or the watching stop operation is detected. Note that data other than these can be included as appropriate.

Figure 17:
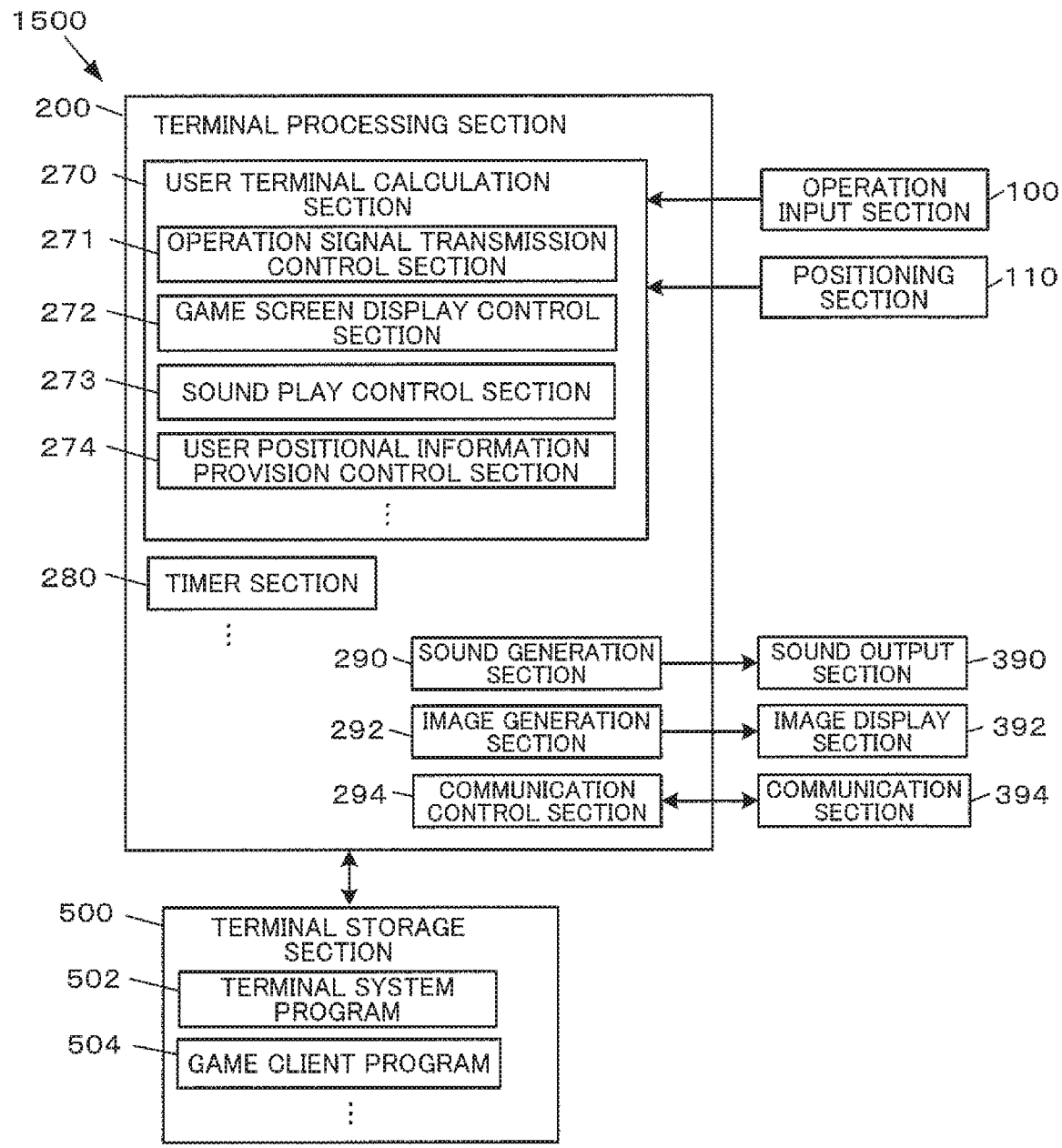
FIG. 17 is a functional block diagram illustrating an example of a functional configuration of a user terminal according to the first embodiment.

FIG. 17 is a functional block diagram illustrating an example of a functional configuration of the user terminal 1500 according to the present embodiment. The user terminal 1500 according to the present embodiment includes an operation input section 100, a positioning section 110, a terminal processing section 200, a sound output section 390, an image display section 392, a communication section 394, and a terminal storage section 500.

The operation input section 100 outputs an operation input signal, based on various operations input by the player, to the terminal processing section 200, and can be implemented with a push switch, a joystick, a touch pad, a track ball, an accelerometer, a gyro, a CCD module, or the like.

The operation input section 100 corresponds to the arrow key 1502, the button switch 1504, and the touch panel 1506 in FIG. 1.

The positioning section 110 outputs user positional information to the terminal processing section 200. In the present embodiment, the positioning section 110 corresponds to the position measurement module 1555 in FIG. 1.

The terminal processing section 200 is implemented with electronic parts such as a processor (e.g., CPU and GPU), an ASIC, and an IC memory. The terminal processing section 200 performs input/output control to exchange data with each of the functional sections including the operation input section 100 and the terminal storage section 500. The terminal processing section 200 executes various calculation processes based on a predetermined program or data, the operation input signal from the operation input section 100, user positional information from the positioning section 110, and various types of data received from the sever system 1100 to control the operation of the user terminal 1500. The terminal processing section 200 corresponds to the control board 1550 in FIG. 1. The terminal processing section 200 according to the present embodiment includes a user terminal calculation section 270, a timer section 280, a sound generation section 290, an image generation section 292, and a communication control section 294.

The user terminal calculation section 270 includes an operation signal transmission control section 271, a game screen display control section 272, a sound play control section 273, and a user positional information provision control section 274.

The operation signal transmission control section 271 performs a process of transmitting various types of data and a request to the server system 1100 in accordance with an operation on the operation input section 100.

The game screen display control section 272 performs control for displaying a game screen based on various types of data received from the server system 1100. In this configuration, the server system 1100 generates the image of the game screen. Alternatively, a configuration where the user terminal 1500 generates the image may also be employed. In this configuration, the game screen display control section 272 may be in charge of controlling an object disposed in a virtual three-dimensional space for generating a 3DCG for example.

The sound play control section 273 performs control to emit a sound (for example, sound effects, BGM, words read by a voice actor, and the like) based on various types of sound data received from the server system 1100.

The user positional information provision control section 274 executes control for providing user positional information to an external device. In the present embodiment, control for automatically transmitting the user positional information to the server system 1100 once in every predetermined interval may be performed, control for transmitting the user positional information when a predetermined request is transmitted to the server system 1100 may be performed, and control for transmitting the user positional information in response to a provision request from the server system 1100 may be performed.

The sound generation section 290 is implemented, for example, with a processor such as a DSP or a sound synthesizing IC, an audio codec for playing a sound file, or the like, and generates a sound signal for sound effects, BGM, various types of operation sound, words read by a voice actor, and the like related to the game, and outputs the signal thus generated to the sound output section 390.

The sound output section 390 is implemented with a device that outputs sound such as sound effects or BGM, based on the sound signal received from the sound generation section 290. The sound output section 390 corresponds to the speaker 1510 in FIG. 1.

The image generation section 292 is implemented, for example, with a processor (e.g., a GPU or a DSP), a video signal IC, a program (e.g., video codec), a drawing frame IC memory (e.g., frame buffer), and the like.

The image generation section 292 generates a game screen (image) every frame (e.g., ⅟₆₀th of a second) based on the various types of data received from the server system 1100, and outputs the image signal of the generated game screen to the image display section 392.

The image display section 392 displays various game images based on the image signals input from the image generation section 292. For example, the image display section 392 may be implemented with an image display device such as a flat panel display, a cathode-ray tube (CRT), a projector, or a head-mounted display. The image display section 392 corresponds to the touch panel 1506 illustrated in FIG. 1 in the present embodiment.

The communication control section 294 performs a data process for data communications, and exchanges data with an external device through the communication section 394. The communication section 394 connects to the communication line 9 to implement communications. For example, the communication section 394 is implemented with a transceiver, a modem, a TA, a jack for a communication cable, a control circuit, and the like, and corresponds to the wireless communication module 1553 in FIG. 1.

The terminal storage section 500 stores therein a system program for implementing various functions for causing the terminal processing section 200 to entirely control the user terminal 1500, a program and various types of data required for the gameplay, and the like. The terminal storage section 500 is used as a work area for the terminal processing section 200, and temporarily stores a result of calculation performed by the terminal processing section 200 in accordance with various programs, input data received from the operation input section 100, and the like. These functions are implemented with an IC memory (e.g., RAM and ROM), a magnetic disk (e.g., hard disk), an optical disk (e.g., CD-ROM and DVD), or the like. The terminal storage section 500 corresponds to the IC memory 1552 and the memory card 1540 in the control board 1550 illustrated in FIG. 1.

The terminal storage section 500 according to the present embodiment stores therein a terminal system program 502 and a game client program 504. Note that other data, including data in which user positional information is stored in time series, can be included as appropriate.

The terminal system program 502 is a program for causing the user terminal 1500 to implement a basic input/output function of a computer.

The game client program 504 is application software that implements a function of the user terminal calculation section 270 when read and executed by the terminal processing section 200, and may be embedded as a part of the terminal system program 502. In the present embodiment, the game client program 504 is a copy of the distributed game client program 505 (see FIG. 7) provided from the sever system 1100.

The game client program 504 may be implemented with a dedicated client program or with a web browser program and a plugin that implements an interactive image display, depending on a technique and a method for implementing a game.

[Process]

Next, a process performed by the game system 1000 is described.

Figure 18:
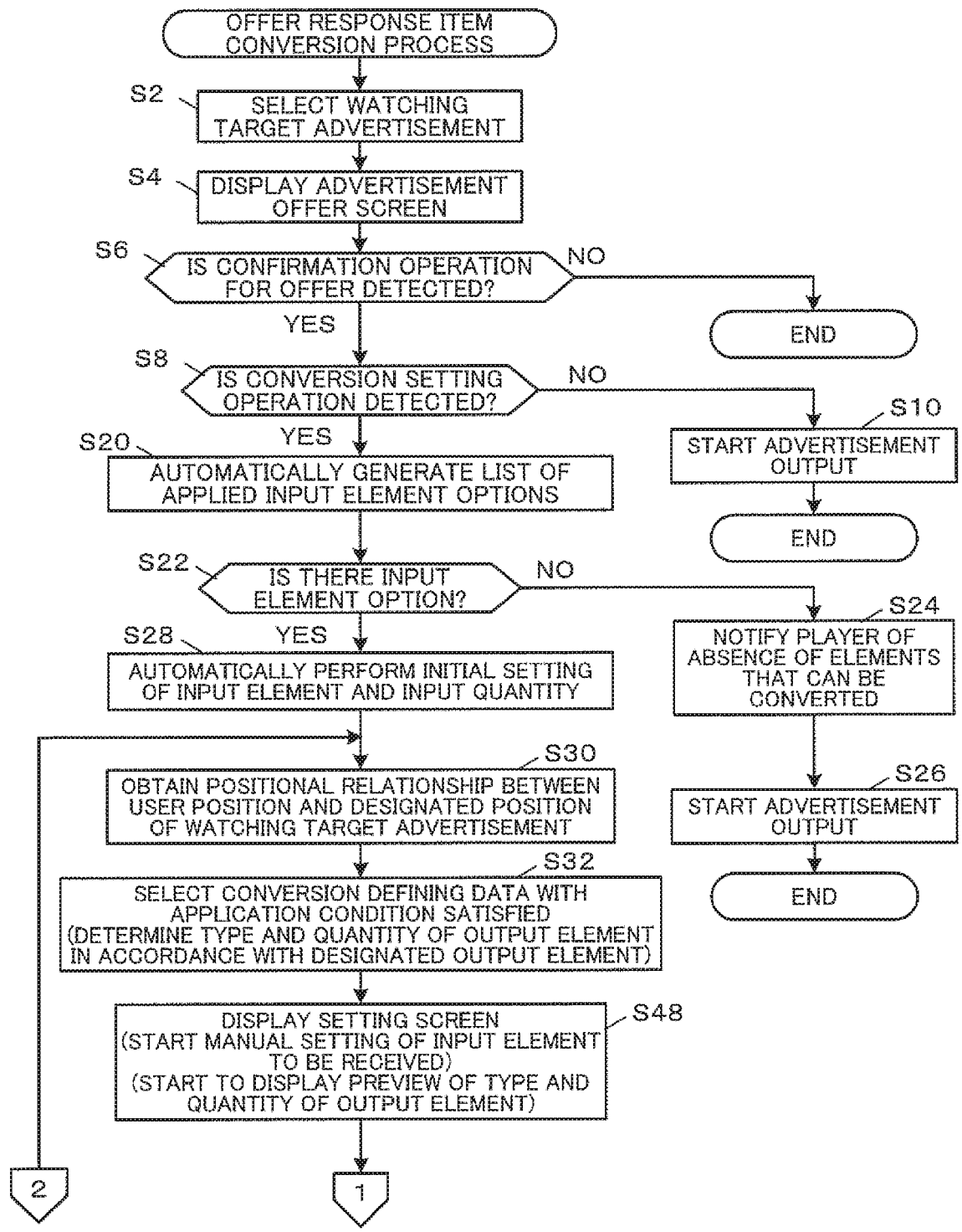
FIG. 18 is a flowchart illustrating a flow of an offer response item conversion process.
Figure 19:
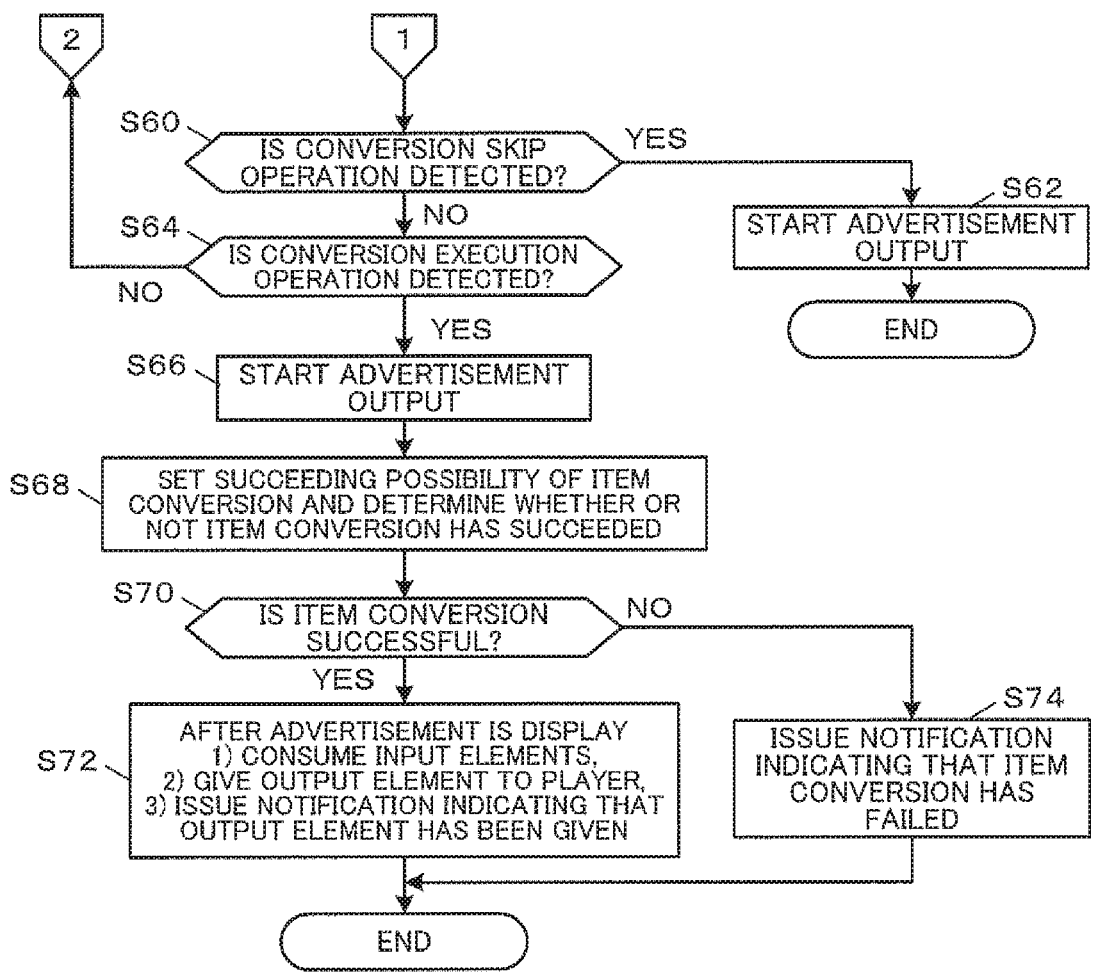
FIG. 19 is a flowchart continuing from FIG. 18.

FIG. 18 and FIG. 19 are each a flowchart illustrating a flow of the process performed by the server system 1100. Specifically, the flowcharts illustrate a series of processes representing a flow of the item conversion performed in return for the advertisement watching after the timing at which the predetermined advertisement watching is determined to have arrived. A flow of the process described herein is referred to as an "offer response item conversion process". The offer response item conversion process is implemented with the server processing section 200s executing the server program 503. It is assumed that the program for the game according to the present embodiment (the game client program 504) has been started in the user terminal 1500, due to a start game operation by the player.

The server system 1100 refers to the advertisement defining data 530 (see FIG. 9) to select one or a plurality of watching target advertisements, and set the watching target advertisement ID 721 in the conversion control data 720 (see FIG. 16) (step S2). Then, the advertisement offer screen W3 (see FIG. 4) is displayed on the user terminal 1500 (step S4).

When the watching denial operation icon 22 or the screen delete operation icon 25 are operated on the advertisement offer screen W3 or no operation has been input for a predetermined period of time after the screen is started to be displayed, the server system 1100 determines that the advertisement offer is not confirmed (NO in step S6), and the process is terminated. Thus, the advertisement is not watched, and thus no item conversion is performed in return for the advertisement watching.

When the first confirmation operation icon 23 is operated on the advertisement offer screen W3, the server system 1100 determines that the advertisement offer is confirmed but the item conversion is not confirmed (NO in step S8), and performs the advertisement output control for outputting the watching target advertisement on the user terminal 1500 (step S10). Then, the process is terminated.

When the second confirmation operation icon 24 is operated on the advertisement offer screen W3, the server system 1100 determines that the advertisement offer is confirmed and that the conversion setting operation for the item conversion has been performed (YES in step S8). Then, a list of input element options is automatically generated (step S20). Specifically, a list of entertainment elements/disposable information with the conversion valid period 635 not expired yet is generated based on the user management data 600 (see FIG. 15) on the player. Then, the list is stored as the applied input element option list 722 in the conversion control data 720 (see FIG. 16).

When there is no input element option to be set to the applied input element option list 722 (NO in step S22), the server system 1100 causes the user terminal 1500 to notify the player of the absence of the possessed entertainment elements/disposable information that can be converted (step S24). Then the advertisement output control is executed (step S26), and the process is terminated.

When there is a input element option (YES in step S22), the server system 1100 makes initial setting to set any one of the input element options to be the input element serving as the base, and makes initial setting to set the input quantity of this input element to "1" (step S28). These initial settings are stored in the base information 723 in the conversion control data 720 (see FIG. 16).

Next, the server system 1100 obtains the relative positional relationship between the user position and the designated position of the watching target advertisement (step S30). Specifically, the user positional information provision request is transmitted to the user terminal 1500 to acquire the latest user positional information. Alternatively, the latest information is read out from the user position coordinate history data 604 in the user management data 600 (see FIG. 15) and checked against the designated positional information range list 556 (see FIG. 9) of the watching target advertisement. Thus, the positional relationship 725 in the conversion control data 720 (see FIG. 16) is determined.

Next, the server system 1100 selects one conversion defining data 570 (see FIG. 10) with the application condition 571 satisfied, and sets the identification information on the data to be the applied conversion defining data ID 726 in the conversion control data 720 (see FIG. 16) (step S32). When there are more than one pieces of defining data satisfying the application condition 571, any one of them is randomly selected. The selection of the applied conversion defining data ID 726 is substantially equivalent to determination of the type and the quantity of the output element Next, the server system 1100 displays the setting screen W4 (see FIG. 5) on the user terminal 1500, so that the manual selection of the input element starts to be received. Furthermore, the server system 1100 starts to display the preview of the type and the quantity of the output element at the current time point (step S48).

Specifically, a description based on the advertisement description data 558 (see FIG. 9) in the advertisement defining data 530 on the watching target advertisement is displayed in the to-be-watched advertisement description section 21 on the setting screen W4. The input element option presenting section 30 presents input element options based on pieces of the option presenting data 528 (see FIG. 8) in the applied input element option list 722.

In the input element description section 31, a description on the item description data 529 and the input element input quantity 723*b* in the item defining data 520 (see FIG. 8) matching the input element type 723*a* in the base information 723 (see FIG. 16) is displayed. Furthermore, a description is displayed based on the item description data 529 and the input element input quantity 724*b* in the item defining data 520 (see FIG. 8) matching the input element type 724*a* in the material information 724 (see FIG. 16).

In the preview section 70, a preview is displayed based on the output element type 580*a* and the output element quantity 580*b*, as a result of referring to the watching completed output element setting 580 in the conversion control data 720 (see FIG. 10) corresponding to the applied conversion defining data ID 726. A preview is also displayed based on the output element type 580*a* and the output element quantity 580*b* in at least one of the watching stopped output element settings 582 selected.

Then, the process proceeds to FIG. 19. When the conversion skip operation icon 71 is operated on the setting screen W4 (see FIG. 5) (YES in step S60), the server system 1100 executes the advertisement output control without executing the item conversion (step S62), and the process is terminated.

As long as the conversion execution operation icon 72 is not operated (NO in step S64) on the setting screen W4, the changing of the input element serving as the base and the adding of the input element serving as the material are repeatedly performed, in accordance with a manual setting operation for the input element, involving display updating in the input element description section 31, the updating of the type and the quantity of the output element, and the updating of the preview displayed in the preview section 70.

When the conversion execution operation icon 72 is operated on the setting screen W4 (YES in step S64), the server system 1100 starts the advertisement output control (step S66). When the advertisement output control starts, the advertisement display control data 730 is generated (see FIG. 16) and the actual watching time 730*a* starts to be counted. In the present embodiment, the player can stop the advertisement watching at any desired timing by inputting the predetermined watching stop operation. When the watching stops, the actual watching time 730*a* stops to be counted. The setting of the standard watching setting information 550 (see FIG. 9) on the watching target advertisement is directly applied to the watching setting.

When the advertisement output completion (that is satisfaction of the completion equivalent condition by the advertisement watching) or the watching stop operation is detected, the server system 1100 sets the succeeding possibility of the item conversion and executes the process of determining whether or not the item conversion has succeeded (step S68). Specifically, the succeeding possibility upper limit value is read out from the succeeding possibility upper limit setting data 590, and the succeeding possibility is set to gradually increase toward the completion of the watching control, so that the succeeding possibility upper limit value is reached when the ratio of the actual watching time 730*a* to the required watching time of the watching target advertisement rises to 100%. Then, the process of determining whether or not the conversion has succeeded is performed based on the succeeding possibility.

When the result of the determining whether or not the conversion has succeeded is "successful" (YES in step S70), the server system 1100 performs 1) control for consuming the input elements serving as the base and the material, 2) control for giving the output element to the player, and 3) issuing a notification indicating that the output element has been given, on the user terminal 1500, that is, control for issuing a notification indicating that the item conversion has been performed (step S72). Then, the series of processes is terminated.

The control for giving the output element includes giving the output element in accordance with the watching completed output element setting 580 in the conversion defining data 570 (see FIG. 16) corresponding to the applied conversion defining data ID 726, when the watching target advertisement is entirely output, and includes giving the output element in accordance with the watching stopped output element setting 582 when the advertisement watching is stopped partway.

When the result of the determining whether or not the conversion has succeeded is "failed" (NO in step S70), the server system 1100 causes the user terminal 1500 to issue a notification indicating that the item conversion has failed (step S74), and the series of processes is terminated without performing the item conversion.

The flow of the process may have step S68, step S70, and step S74 omitted.

In the present embodiment as described above, the improvement control, for power up or evolution for an item (input element) selected from items possessed by the player, is performed in return for the advertisement watching. Thus, the player can be incentivized to watch the advertisement.

In the present embodiment, the player can watch the same advertisement with different input elements selected, with the improvement control performed for each input element selected. Thus, the player can be more incentivized to watch the advertisement than in conventional cases.

The player watches the advertisement while recognizing the improvement control to be performed in return for the advertisement watching in advance on the setting screen W4. Thus, the advertisement in the present embodiment is regarded as "the cost paid by the player to achieve power up/evolution of an item at his or her discretion" rather than "an advertisement provided by the game administrator to be watched". The advertisement is watched with higher contentment in terms of give-and-take, than conventional reward advertisement not enabling the player to know what is given until the reward is actually given. This point also contributes to further incentivizing the player to watch the advertisement.

Second Embodiment

Next, a second embodiment of the present invention is described. The present embodiment is implementing in basically the same manner as that in the first embodiment, but has the following distinct features including 1) the cost for the item conversion can be manually selected from advertisement watching, consumption of the traveled distance, and consumption of the bonus point and 2) the player can manually select the advertisement to be watched. Components that are the same as the counterparts in the first embodiment are denoted with the same reference numerals, and the description thereof will be omitted. The difference from the first embodiment will be mainly described.

The system configuration according to the present embodiment is implemented in the same manner as that in the first embodiment (see FIG. 1).

The server system 1100 according to the present embodiment has the same functional configuration as that in the first embodiment (see FIG. 6). The advertisement watching setting section 233 according to the present embodiment can perform various watching settings including the selecting of an advertisement as a target of the advertisement watching based on the operation input by the user, and the selecting of means for paying the cost for the item conversion from predetermined options including the advertisement watching (including the consumption of the traveled distance and the consumption of the bonus point in the present embodiment).

Figure 20:
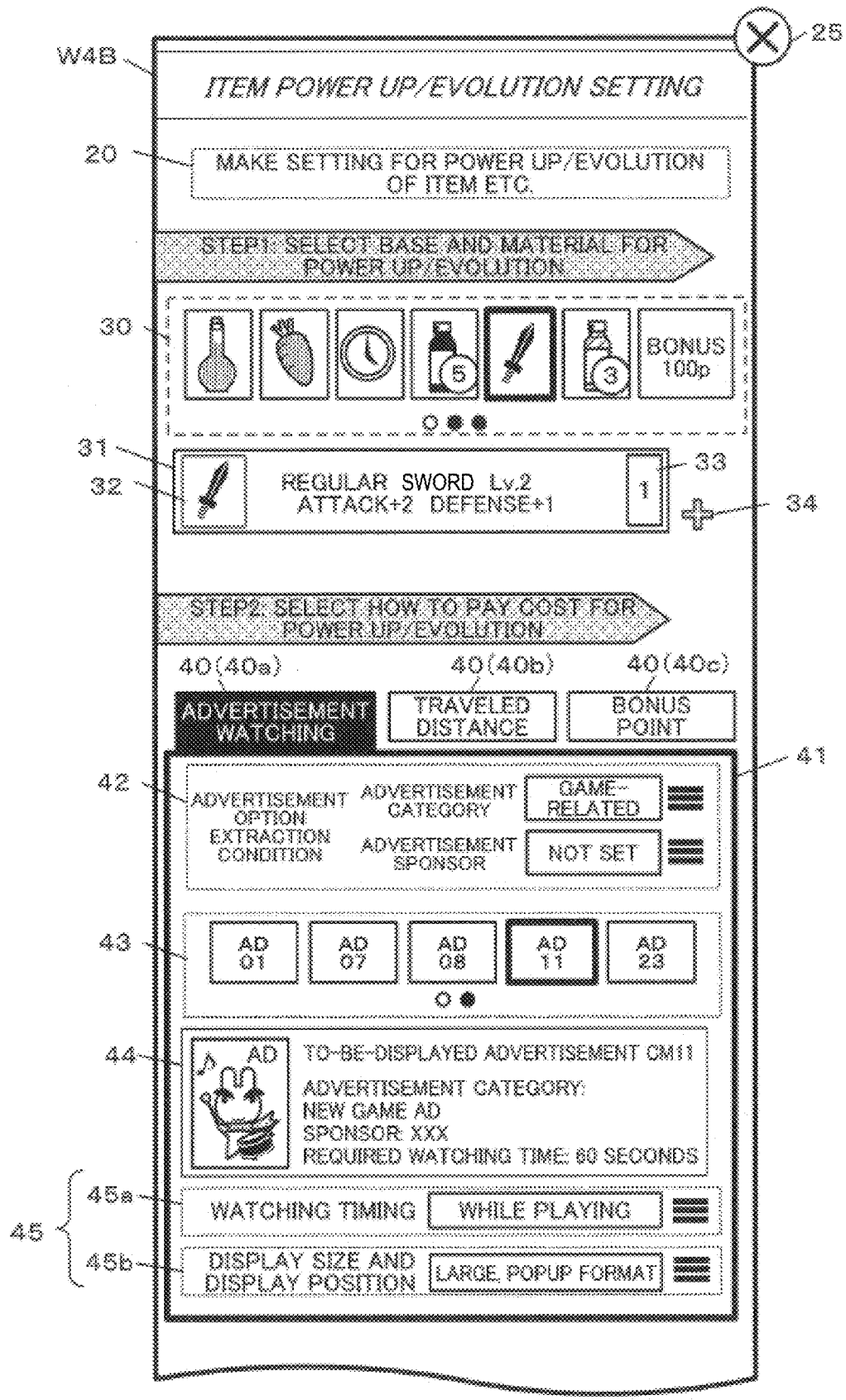
FIG. 20 is a first diagram illustrating a display example of a setting screen according to a second embodiment.
Figure 21:
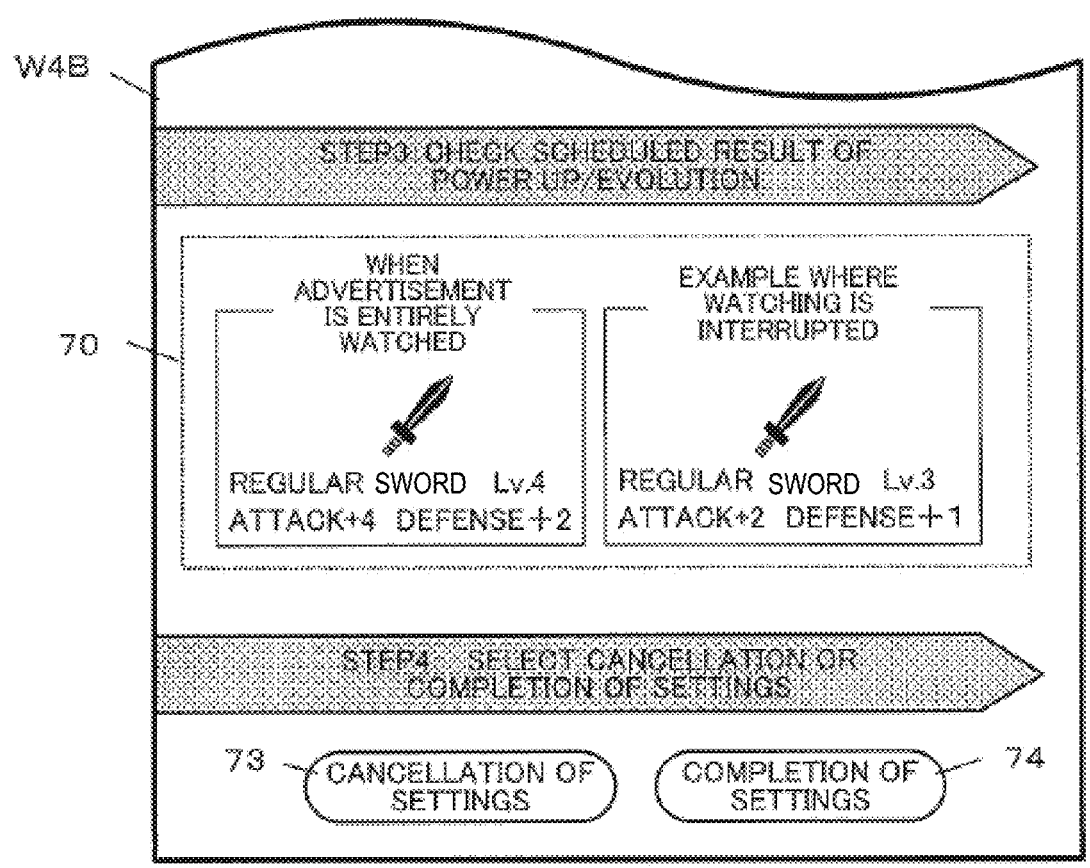
FIG. 21 is a second diagram illustrating a display example of a setting screen according to the second embodiment.

FIG. 20 and FIG. 21 are each a diagram illustrating an example of a setting screen W4B according to the present embodiment. The setting screen W4B according to the present embodiment can be called from a menu displayed after the game has been started in the user terminal 1500 and a predetermined login procedure has been completed.

The setting screen W4B according to the present embodiment is for confirming and inputting a selection operation for a first step of selecting the base and the material for power up/evolution, a second step of selecting how to pay the cost for power up/evolution, a third step for checking the scheduled result of the power up/evolution, and a fourth step of selecting cancellation or completion of settings.

Specifically, the setting screen W4B includes the screen description 20 and the screen delete operation icon 25. The setting screen W4B includes an input element option presenting section 30 and an input element description section 31 related to the first step. The setting screen W4B includes a cost payment method selection icon 40 (40a, 40b, . . . ) and a detail setting field 41 related to the second step. The setting screen W4B includes the preview section 70 related to the third step. The setting screen W4B includes a setting cancellation operation icon 73 and a setting completion operation icon 74 related to the fourth step.

The cost payment method selection icon 40 (40a, 40b, . . . ) is prepared for each option of a method for paying the cost for the item conversion. In the present embodiment, three options of "advertisement watching (40a)", "consumption (40b) of the accumulated traveled distance 605 (see FIG. 15)", and "consumption (40c) of the possessed bonus point 606 (see FIG. 15)" are prepared. The payment method option is not limited to these. One of the consumption of the accumulated traveled distance 605 and the consumption of the possessed bonus point 606 or both may be omitted. Furthermore, another option such as consumption of a possessed item may be added. In the present embodiment, the "advertisement watching (40a)" is selected as the initial setting.

When any one of the cost payment method selection icons 40 (40a, 40b, . . . ) is selected, a detailed setting item related to the corresponding option is displayed on the detail setting field 41.

In the illustrated example, the "advertisement watching (40a)" is selected, and the advertisement option extraction condition setting section 42, the advertisement option display section 43, the to-be-watched advertisement description section 44, and the watching environment setting section 45 are displayed on the detail setting field 41.

The advertisement option extraction condition setting section 42 sets conditions for extracting an option of the watching target advertisement presented on the advertisement option display section 43. In the present embodiment, two conditions on a category of an advertisement content and a sponsor of the advertisement can be set. Thus, the category of the advertisement content and/or the advertisement sponsor, in settings related to the advertisement watching control, are set by the advertisement option extraction condition setting section 42. Items that can be set by the advertisement option extraction condition setting section 42 may be limited to any one of these. Note that items other than these, such as the output mode (movie/still image/audio only), the required watching time, and for male/female, may be added as appropriate.

The advertisement option display section 43 presents selection options of the watching target advertisement. In an example illustrated in FIG. 20, an icon or a short movie of a representative scene of an advertisement option is displayed for each advertisement option. Alternatively, a list format may be employed. When a predetermined selection operation (such as a touch operation on an icon) is performed on the advertisement option display section 43, a corresponding advertisement is set as the watching target advertisement. Then, a description on the advertisement is displayed on the to-be-watched advertisement description section 44.

In the watching environment setting section 45, environment settings (advertisement watching condition and format) are made. The content of the setting items can be set as appropriate. In the present embodiment, the section includes a timing setting section 45a and a size and position setting section 45b.

The timing setting section 45a enables designation of a timing, which is one advertisement watchable timing, for watching the advertisement. Settable options of such timings, which can be set as appropriate, include before gameplay (while the menu screen is being displayed, during online shopping, and during deck building), during gameplay, after gameplay, and not designated. Detailed options, such as while moving in the map, after a battle, and a change of scenes, may be set for the timing during the gameplay. Furthermore, options such as a date on which the watching target advertisement is output and a time zone or a day of a week in which the watching target advertisement is output may be included as appropriate.

The display size and position setting section 45*b* enables a combination of a type of the display size and a display mode to be selected. For example, large/medium/small, which are a plurality of sizes of the advertisement relative to the display size of the touch panel 1506 of the user terminal 1500, are prepared for the display size. Preferably, a popup format with an individual screen popup displayed on the game screen, a banner format with a strip shaped advertisement displayed at an edge of the screen, and the like are set for the display mode.

Setting items of the watching environment setting section 45 may be added or omitted as appropriate. For example, a setting for determining whether a single advertisement is displayed at a single timing or is divided to be displayed at a plurality of timings, or a setting for enabling/disabling a stop operation for stopping the watching partway may be included as appropriate.

Figure 22:
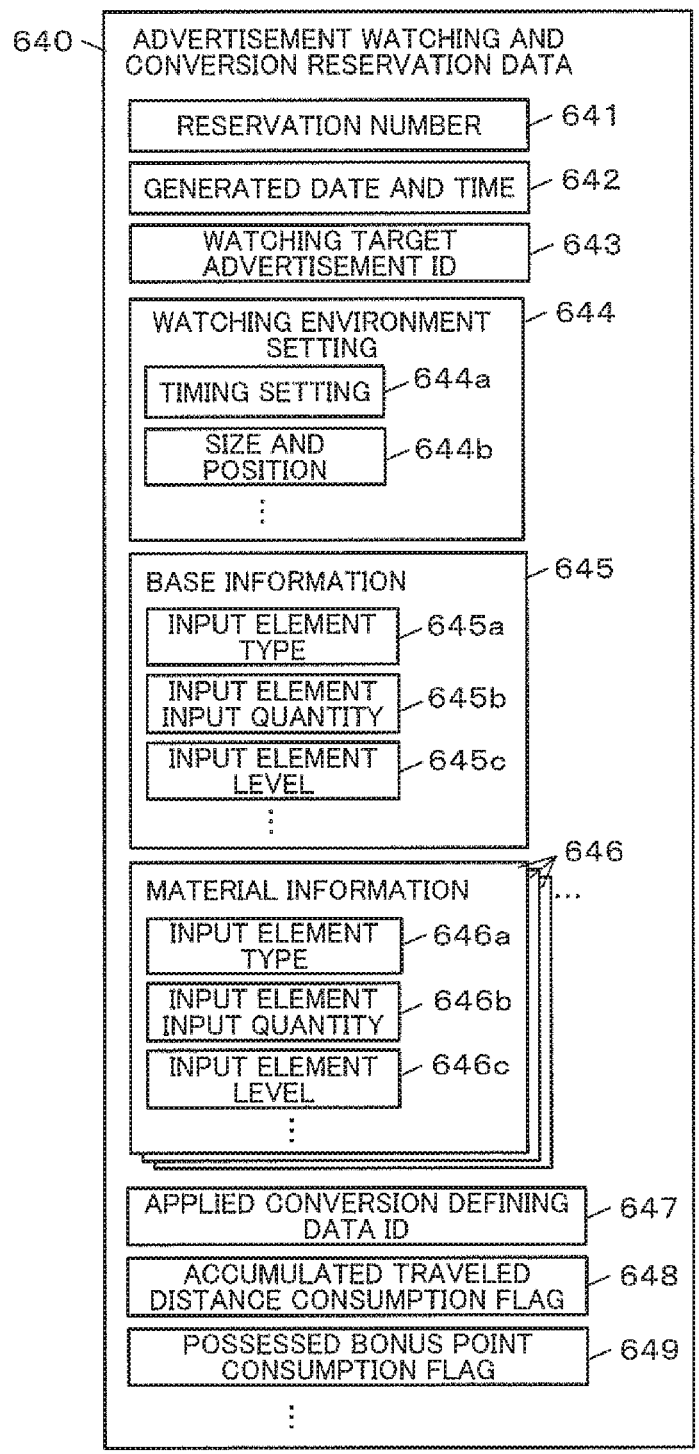
FIG. 22 is a diagram illustrating an example of a data structure of advertisement watching and conversion reservation data.

When the setting cancellation operation icon 73 is operated on the setting screen W4B according to the present embodiment, the item conversion setting is cancelled. When the setting completion operation icon 74 is operated, advertisement watching and conversion reservation data 640 as illustrated in FIG. 22 are generated in the user management data 600 on the player stored in the server storage section 500*s*.

The advertisement watching and conversion reservation data 640 includes
1) a reservation number 641 that is a serial number automatically given,
2) generated date and time 642 at which the data is generated,
3) a watching target advertisement ID 643 and a watching environment setting 644 set when the advertisement watching is selected as the item conversion cost payment method,
4) base information 645,
5) material information 646,
6) applied conversion defining data ID 647,
7) an accumulated traveled distance consumption flag 648 set when the consumption of the accumulated traveled distance is selected as the item conversion cost payment method, and
8) a possessed bonus point consumption flag 649 set when the consumption of the possessed bonus point is selected as the item conversion cost payment method. Note that data other than these can be included as appropriate.

The content of the watching environment setting 644 may be set depending on the design of an item settable by the player. In the present embodiment, the setting includes a timing setting 644*a* and a size and position arrangement setting 644*b*.

The base information 645, the material information 646, and the applied conversion defining data ID 647 are respectively copies of the base information 723, the material information 724, and the applied conversion defining data ID 726 in the conversion control data 720 (see FIG. 16) at the point when the reservation is made.

Figure 23:
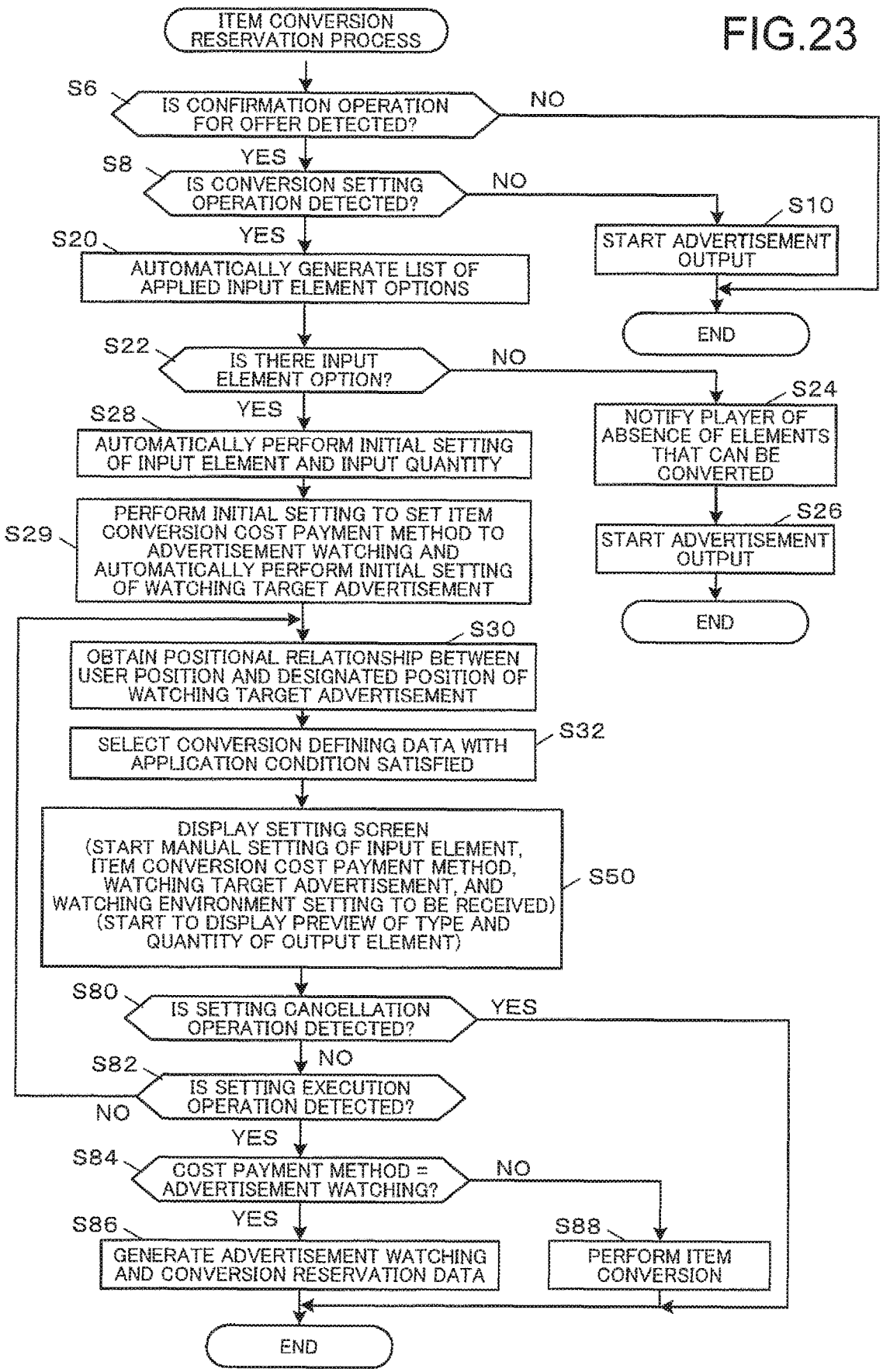
FIG. 23 is a flowchart illustrating a flow of an item conversion reservation process.

FIG. 23 is a flowchart illustrating a flow of a process related to item conversion setting performed by the server system 1100 according to the present embodiment. This process is referred to as "item conversion reservation process". The item conversion reservation process is performed by performing a predetermined calling operation. In the present embodiment, "item power up/evolution reservation" is provided in the menu item provided after the login, and can be operated for performing the calling operation.

A flow of the item conversion reservation process is basically the same as that of the process in the first embodiment (see FIG. 18 and FIG. 19), but has step S2 and step S4 omitted. Furthermore, after step S28, the server system 1100 performs initial setting to set the item conversion cost payment method to the "advertisement watching" and the initial setting of the watching target advertisement is automatically performed (step S29). In this step, the advertisement may be set and selected based on a priority condition additionally prepared by the game administrator or may be randomly selected, from the advertisement defining data 530.

Step S50 is provided instead of step S48 in the first embodiment. Specifically, the setting screen W4B is displayed, and manual selection of the input element, the item conversion cost payment method, the watching target advertisement, and the watching environment setting (setting on the content of the advertisement watching control) starts to be received, and the preview of the type and the quantity of the output element starts to be displayed (step S50).

When the setting cancellation operation is input on the setting screen W4B (YES in step S80), the item conversion reservation process is terminated without generating the advertisement watching and conversion reservation data 640.

When the setting execution operation is input (YES in step S82) and the item conversion cost payment method is set to be the "advertisement watching" (YES in step S84), the server system 1100 newly generates the advertisement watching and conversion reservation data 640 (step S86), and the item conversion reservation process is terminated.

When the setting execution operation is input (YES in step S82) and the item conversion cost payment method is set to be the "consumption of the accumulated traveled distance" or the "consumption of the possessed bonus point" (NO in step S84), the server system 1100 performs the item conversion, that is, power up/evolution for an item with a predetermined amount of the accumulated traveled distance 605 (see FIG. 15) or the possessed bonus point 606 (see FIG. 15) consumed depending on the setting of the cost payment method, without performing the advertisement output control (step S88). Then, the item conversion reservation process is terminated.

Figure 24:
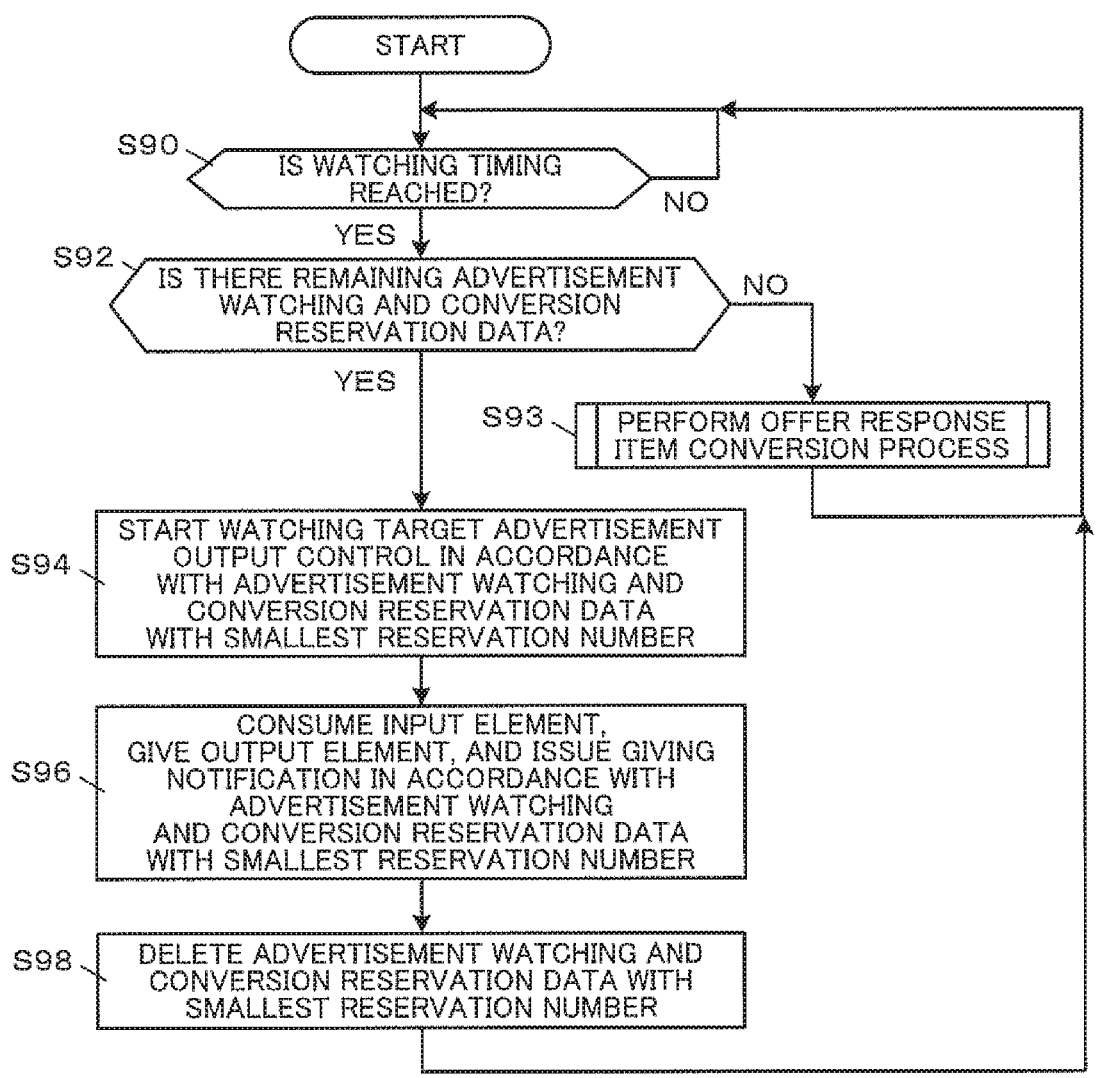
FIG. 24 is a flowchart illustrating a flow of a process related to an advertisement and item conversion according to a second embodiment, performed during a process other than the item conversion reservation process is performed.

FIG. 24 is a flowchart illustrating a flow of a process related to an advertisement and the item conversion performed by the server system 1100 according to the present embodiment, while a process other than the item conversion reservation process is being performed.

The server system 1100 according to the present embodiment periodically determines the watching timing. When the watching timing is reached (YES in step S90) with the advertisement watching and conversion reservation data 640 remaining (YES in step S92), the watching target advertisement output control is started in accordance with the advertisement watching and conversion reservation data 640 with the smallest reservation number 641 (step S94). When the output of the advertisement is completed (that is, when the watching completion equivalent condition is satisfied) or the watching is stopped partway, the input element is consumed, the output element is give, and the giving notification is issued in accordance with the conversion defining data 570 (see FIG. 10) indicated by the applied conversion defining data ID 647 in the advertisement watching and conversion reservation data 640 (see FIG. 22) (step S96). Then, the advertisement watching and conversion reservation data 640 is deleted (step S98).

When the advertisement watching timing arrives with no remaining advertisement watching and conversion reservation data 640 (NO in step S92), the server system 1100 according to the present embodiment performs the offer response item conversion process (see FIGS. 18 and 19).

The present embodiment described above can achieve the same effects as the first embodiment, and enables the player to set the advertisement to be watched, a timing of displaying the advertisement, how the advertisement is displayed, and the item conversion in advance.

Third Embodiment

Next, a third embodiment of the present invention is described. The present embodiment is basically implemented in a manner similar to that in the first embodiment, but has a distinct feature that the advertisement output control is automatically performed. In the first embodiment, the player is requested to confirm the advertisement watching and set the item conversion before the advertisement starts to be output, and the advertisement output control is performed in accordance with the response from the player. In the present embodiment, the advertisements are automatically displayed one after another without the player's confirmation. The, the input element and the like are set while the advertisement is being displayed, to be converted into the output element to be given when the advertisement watching is terminated. Components that are the same as the counterparts in the first embodiment are denoted with the same reference numerals, and the description thereof will be omitted. The difference from the first embodiment will be mainly described.

The configuration of a game system according to the present embodiment is the same as that in the first embodiment.

The functional configuration according to the present embodiment is also the same as that in the first embodiment.

Figure 25:
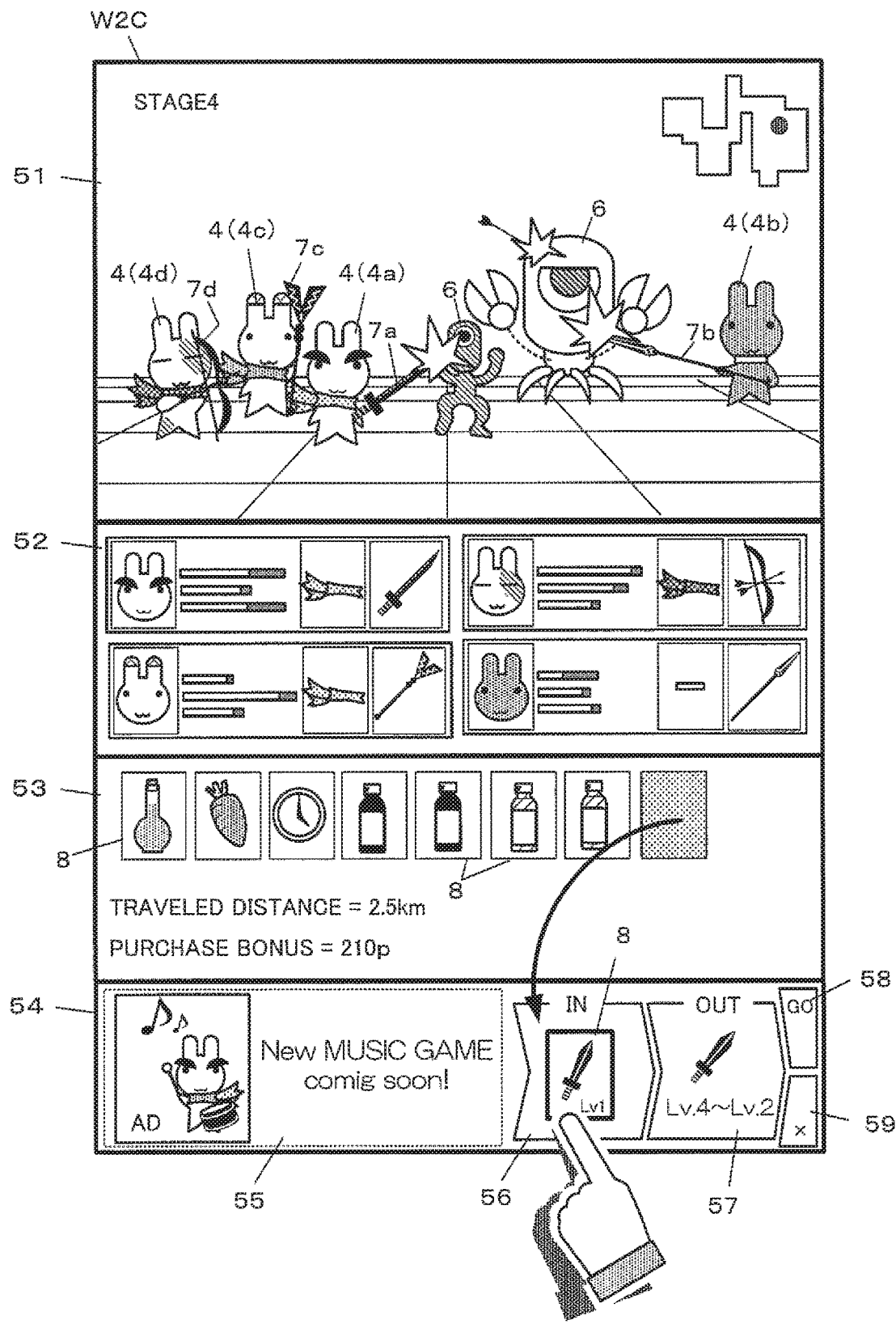
FIG. 25 is a diagram illustrating an example of a game screen displayed on a user terminal during gameplay according to a third embodiment.

FIG. 25 is a diagram illustrating an example of a game screen displayed on the user terminal 1500 during gameplay according to the present embodiment. The game screen W2C according to the present embodiment includes a main display section 51 illustrating the player characters 4 (4*a*, 4*b*, . . . ), a status display section 52 displaying the equipment and parameter values of the player characters 4 (4*a*, 4*b*, . . . ), a possessed item display section 53 displaying entertainment elements/disposable information possessed by the player, and an advertisement display section 54.

The advertisement display section 54 includes an advertisement display area 55 in which advertisements are switched from one to another to be sequentially displayed automatically, an input element setting area 56 for setting an item to be the input element, an output element preview area 57 displaying a preview of the output element, a conversion execution operation icon 58, and a conversion skip operation icon 59.

When a predetermined setting operation (for example, a drag-and-drop operation) is performed to move the icon 8 corresponding to one item displayed on the possessed item display section 53 to the input element setting area 56, the entertainment elements/disposable information corresponding to the icon is set to be the input element. When the setting operation is repeatedly performed on the same icon 8, the input quantity of the input element increases. When the setting operation is performed on a different icon 8, the input element setting is updated. An item corresponding an icon 8 on which a setting operation is performed to set a first type of item serves as the base, and an item corresponding an icon 8 on which a setting operation is performed to set a second or later type of item serves as the material as in the first embodiment.

The output element preview area 57 corresponds to the preview section 70 according to the first embodiment. Thus, when the input element is set, the output element is determined as in the first embodiment, and a preview of the output element is displayed on the output element preview area 57.

When the player is satisfied with the content of the conversion and operates the conversion execution operation icon 58, the item conversion is executed. Thus, the input element is consumed, and the output element is given. When the player is unsatisfied with the content of the conversion and thus operates the conversion skip operation icon 59, the item conversion is cancelled.

Figure 26:
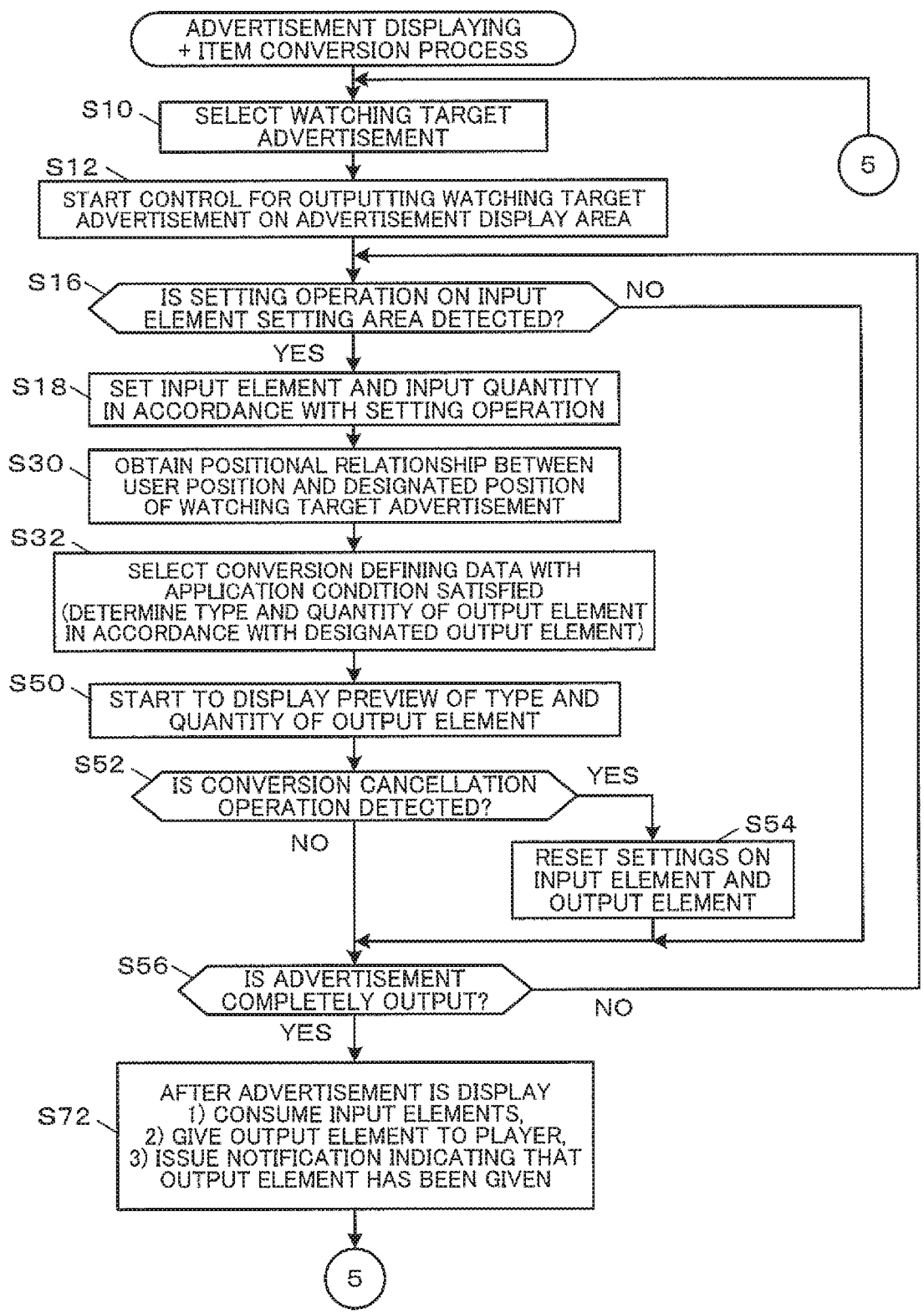
FIG. 26 is a flowchart illustrating a flow of an advertisement displaying+item conversion process.

FIG. 26 is a flowchart illustrating a flow of a process related to advertisement output and item conversion performed by the server system 1100 according to the present embodiment. A flow of the process described herein is referred to as "advertisement displaying+item conversion process".

The server system 1100 selects a watching target advertisement (step S10). The result of the selection is set to the watching target advertisement ID 721 in the conversion control data 720 (see FIG. 16).

The server system 1100 starts control for outputting the watching target advertisement on the advertisement display area 55 (step S12). The processes in steps S16 to S56 are repeated as long as the advertisement is not completely output (NO in step S56).

Until one advertisement is completely output, upon detecting the setting operation on the input element setting area 56 (YES in step S16), the server system 1100 sets the input element serving as the base and the input element serving as the material (step S18), and obtains the positional relationship 725 (step S30). Then, the applied conversion defining data 570 is selected (step S32), and a preview is started to be displayed on the output element preview area 57 (step S50).

Each time a conversion cancellation operation is detected (step S52 YES) during the process, the server system 1100 can reset the settings on the input element and the output element (step S54).

When the advertisement is completely output, that is, when the advertisement watching completion equivalent condition is satisfied (YES in step S56), the input element is consumed, the output element is given to the player, and the element giving notification is issued (step S72). Then, the process returns to step S10.

Steps S68 and S70 may be additionally provided between steps S56 and S72, and the process may proceed to step S74 when the result of step S70 is NO, as in the first embodiment (see FIG. 19).

The present embodiment can provide the same advantageous effect as the first embodiment.

Fourth Embodiment

Next, a fourth embodiment of the present invention is described. The present embodiment is implemented to be basically the same with any one of the first to the third embodiments, but is different from the first to the third embodiments in that the user terminal 1500 performs the game management and advertisement management process. The following description is mainly based on the first embodiment. Components that are the same as the counterparts in the first to the third embodiments are denoted with the same reference numerals, and the description thereof will be omitted. The difference from the first embodiment will be mainly described.

Figure 27:
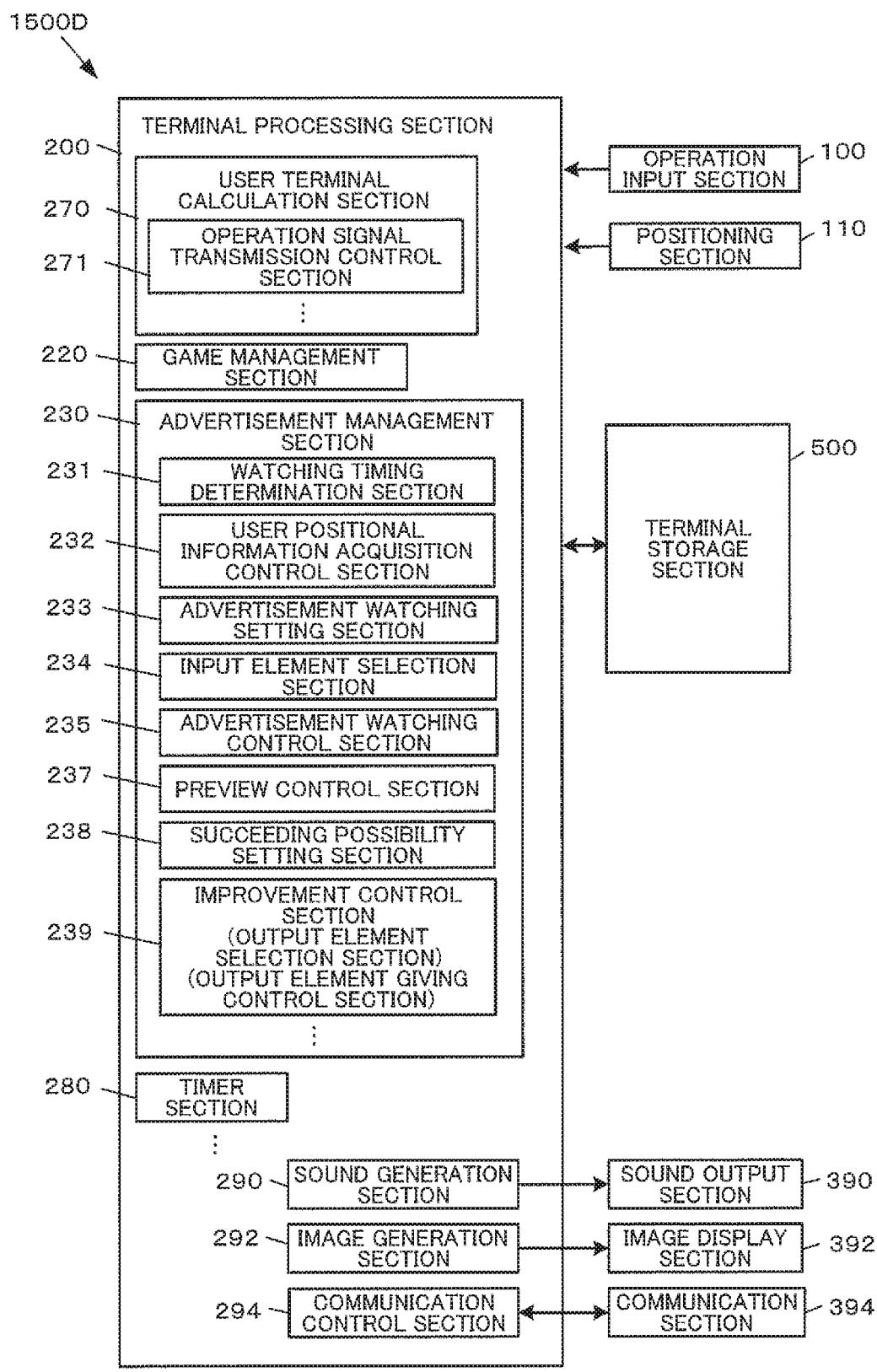
FIG. 27 is a functional block diagram illustrating an example of a functional configuration of a user terminal according to a fourth embodiment.

FIG. 27 is a functional block diagram illustrating an example of a functional configuration of a user terminal 1500D according to the present embodiment. The user terminal 1500D according to the present embodiment is a computer system in which the game screen display control section 272, the sound play control section 273, and the user positional information provision control section 274 are omitted and the game management section 220 and the advertisement management section 230 are provided instead. Specifically, the user terminal 1500D according to the present embodiment does not acquire data for displaying a game screen image or data for playing sounds from the server system 1100, but performs a calculation process related to the game management to perform the game progress control, and thus generates images of the game screen and an advertisement and controls the sound play therefor. The user terminal 1500D determines a timing to output an advertisement and also sets and executes the item conversion.

Figure 28:
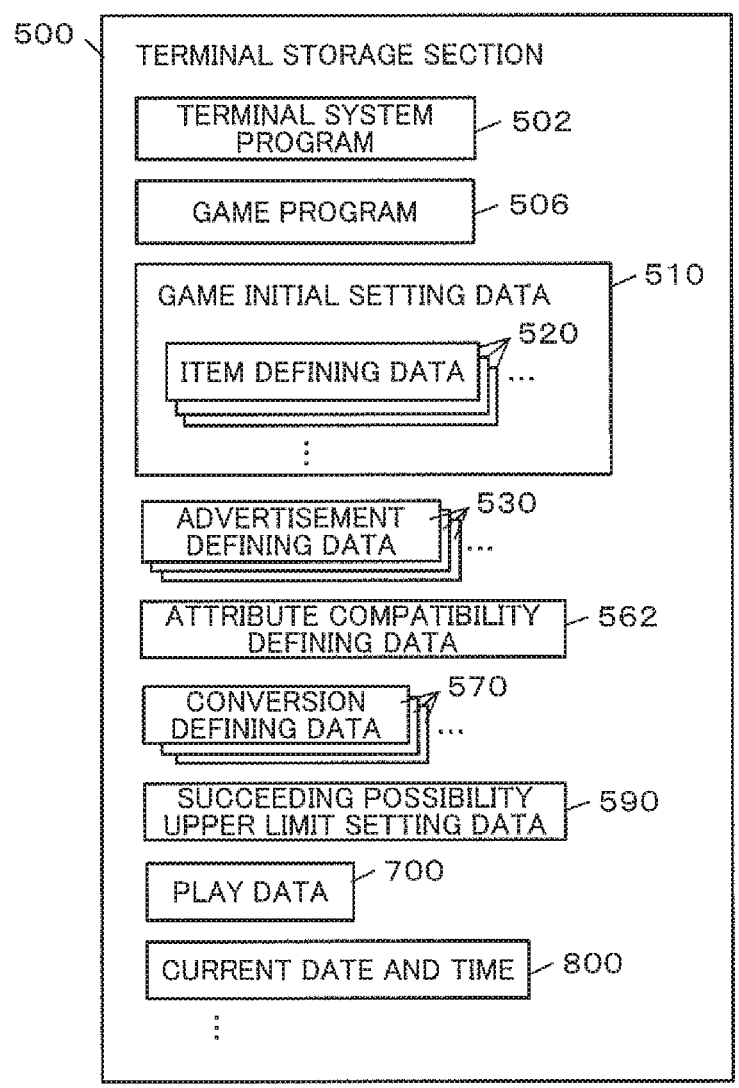
FIG. 28 is a diagram illustrating an example of a program and data stored in a terminal storage section of a user terminal according to the second embodiment.

FIG. 28 is a diagram illustrating an example of a program and data stored in the terminal storage section 500 of the user terminal 1500D according to the present embodiment. The terminal storage section 500 according to the present embodiment stores therein the terminal system program 502 and the game program 506. Thus, as the user terminal 1500D processes the game management section 220 and the advertisement management section 230, the game initial setting data 510, the advertisement defining data 530, the attribute compatibility defining data 562, the conversion defining data 570, and the play data 700 are stored in the terminal storage section 500.

The game program 506 is a program that causes the terminal processing section 200 to implement the user terminal calculation section 270, and the game management section 220, and the advertisement management section 230 according to the present embodiment.

Since the present embodiment is based on the first embodiment, the flow of the process according to the present embodiment is basically the same as the flow of the process (see FIG. 18 and FIG. 19) performed by the server system 1100 according to the first embodiment. The user terminal 1500D implements the game management section 220 and the advertisement management section 230, and thus the subject of each step may be changed to the user terminal 1500D as appropriate.

To implement the present embodiment based on the second embodiment, the flow of the process according to the present embodiment is basically the same as the flow of the process (see FIG. 23 and FIG. 24) performed by the server system 1100 according to the second embodiment. The user terminal 1500D implements the game management section 220 and the advertisement management section 230, and thus the subject of each step may be changed to the user terminal 1500D as appropriate. As a matter of course, to implement the present embodiment based on the third embodiment, the flow of the process according to the present embodiment is basically the same as the flow of the process (see FIG. 26) performed by the server system 1100 according to the third embodiment.

No matter which of the first to the third embodiments the present embodiment is based on, when the user terminal 1500D performs a process requiring the user management data 600 to be referred to/changed, the server system 1100 is requested to provide required data, perform matching, or the like or may be requested to perform the entire process as appropriate.

The present embodiment can provide the same advantageous effect as the embodiment among the first to the third embodiments on which the present embodiment is based. The user terminal 1500D may be partially in charge of the functions of the game management section 220 and the advertisement management section 230, instead of being entirely in charge of the functions.

[Modifications]

The embodiments to which the present invention is applied have been described above. Note that the present invention is not limited thereto. Various modifications may be made as appropriate, such as adding other elements, omitting some of the elements, or changing some of the elements.

[First Modification]

For example, in the example according to the first embodiment, the entire game system is implemented with a client-server system. However, this should not be construed in a limiting sense. For example, a computer system in which a plurality of user terminals 1500 can establish a peer-to-peer (P2P) connection may be implemented for a battle game. Specifically, the server system 1100 provides data as a matching result to the user terminals 1500 matched by the server system 1100, and then the user terminals establish the P2P connection. One of the user terminals 1500 is in charge of the functions of the game management section 220 and the advertisement management section 230. Alternatively, a plurality of user terminals 1500 may cooperate to implement the functions.

[Second Modification]

The system according to the examples described in the embodiments described above includes the server system 1100 and the plurality of user terminals 1500. Alternatively, the present invention may be similarly applied to a game system including a single computer. For example, the present invention may be applied to a single game device. Thus, for implementing advertisement output, a single advertisement output control device may be employed.

Figure 29:
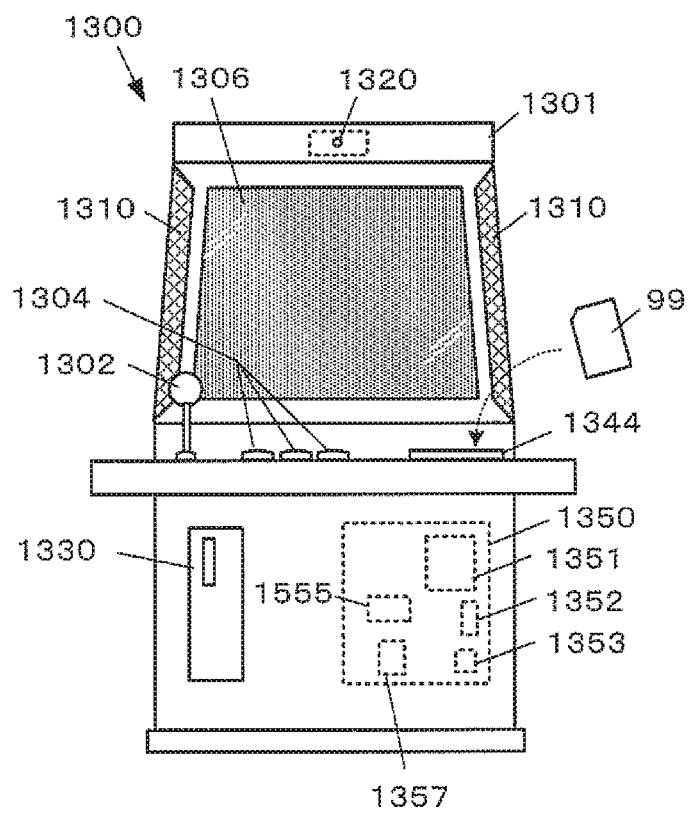
FIG. 29 is an external front view illustrating an example of a configuration of an arcade game device employing the present invention.

Specifically, FIG. 29 is an outer front view illustrating an example of a configuration of an arcade game device 1300 employing the present invention. The arcade game device 1300 includes a casing main body 1301 provided with operation input units, used by the player to input operations, including: a joystick 1302; a button switch 1304; and a touch panel 1306 that functions as an image display device and as a touch position input device. The casing main body 1301 is further provided with a speaker 1310, a player image capturing camera 1320, a payment device 1330, a medium reading device 1344 for writing and reading data to and from an electronic payment medium 99, and a control board 1350.

The control board 1350 includes various processors (e.g., a CPU 1351, a GPU, and a DSP), various IC memories 1352 (e.g., a VRAM, a RAM, and a ROM), a communication device module 1353 for establishing communication connection with the communication line 9, a position measurement module 1355, an I/F controller 1357 (interface controller), and the like.

For example, the I/F controller 1357 includes 1) a driver circuit for the touch panel 1306, 2) a circuit that receives a signal from the joystick 1302 and the button switch 1304, 3)

an output amplifier circuit that outputs a sound signal to the speaker 1310, 4) a circuit that reads image data on an image captured by the player image capturing camera 1320, 5) a circuit for outputting and receiving a signal to and from the payment device 1330 and the medium reading device 1344, 6) a circuit for receiving a signal from the position measurement module 1355, and the like.

These elements of the control board 1350 are electrically connected to each other via a bus circuit, to be capable of reading and writing data and exchanging signals. The control board 1350 may be partially or entirely implemented with an ASIC, an FPGA, or a SoC.

The control board 1350 executes the game program to perform the calculation process, and controls each section of the arcade game device 1300 to enable the gameplay in accordance with an operation input with the joystick 1302, the button switch 1304, and the touch panel 1306. The arcade game device 1300 has a required program and various types of setting data in the IC memory 1352 in advance. Alternatively, the program and the data may be downloaded from an external device each time the system is booted.

The control board 1350 performs control so that the arcade game device 1300 sequentially transmits the result of the operation input using the joystick 1302, the touch panel 1306, or the like to the server system 1100 and receives the various types of data for playing the game from the server system 1100. The image of the game screen is generated and displayed on the touch panel 1306, and the sound signal corresponding to the sound effects and an operation sound is generated and emitted from the speaker 1310. Thus, the player can enjoy the gameplay as well as watching an advertisement, by operating the joystick 1302 or the like while watching the game screen displayed on the touch panel 1306 and listening to the game sound from the speaker 1310.

In this configuration, the functions of the server system 1100 and the user terminal 1500 according to the first embodiment are implemented with the arcade game device 1300 alone.

Note that the advertisement defining data 530, the conversion defining data 570, the user management data 600, and the like may be stored in the server system 1100 as in the first embodiment, and data may be acquired and updated with the arcade game device 1300 issuing a request to the server system 1100 each time the acquisition or the updating is required.

[Third Modification]

In the embodiments described above, the grade of the output element given when the watching target advertisement is only watched partway is lower than that given when the watching target advertisement is entirely watched. Preferably, how much longer the advertisement needs to be watched to acquire the output element, scheduled to be given when the watching is completed, is presented to the player while the advertisement watching is in process.

Figure 30:
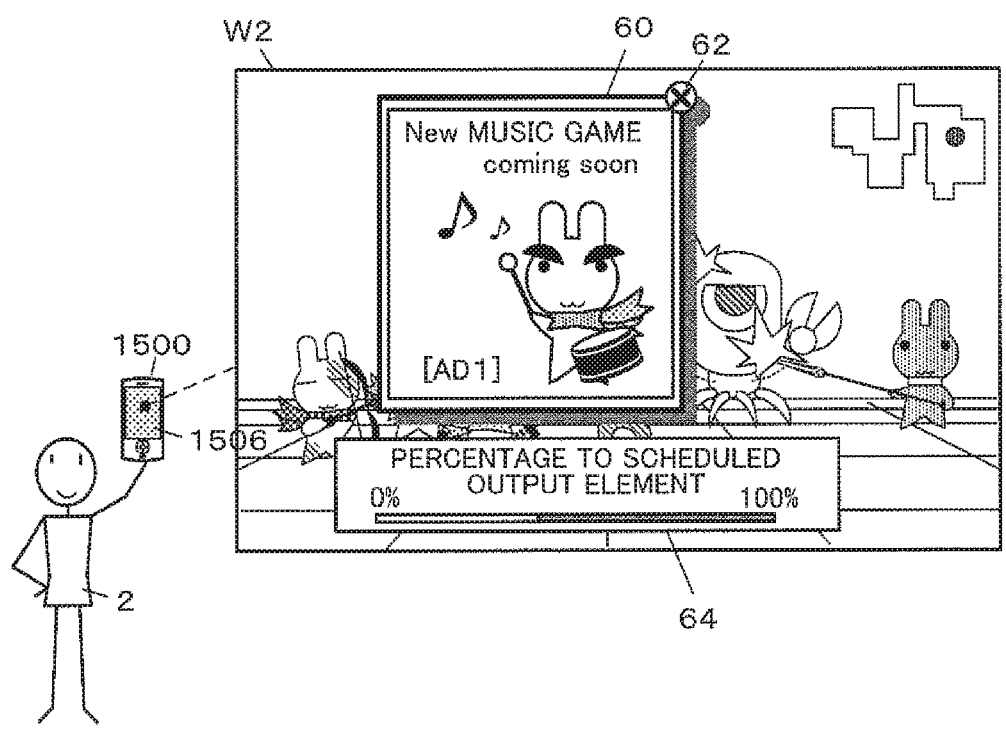
FIG. 30 is a diagram illustrating an example of a game screen with an advertisement displayed.

For example, as illustrated in FIG. 30, the advertisement 60 is displayed on the game screen W2, sound is output, and a watching stop operation icon 62 is displayed on the user terminal 1500. Furthermore, a meter 64 indicating a ratio of the currently watched time may be displayed with the required watching time set to be 100%.

[Fourth Modification]

In the above embodiment, an example where the item conversion is performed in return for the advertisement watching related to the game is performed. Note that the item conversion may be performed based on an advertisement on a display screen for user operation in a website providing various services to registered users. In such a configuration, the input element is preferably set to be a membership point usable as a service fee, a coupon such as a rental coupon, an even participation ticket, a free lottery ticket, or the like that is determined in accordance with how frequently the user uses the website.

[Fifth Modification]

In the embodiment described above, the item as a result of the power up/evolution in return for the advertisement watching is treated in the same manner as the same type of item that can be purchased through online shopping or the same type of item as a result of the power up/evolution performed by consuming the accumulated traveled distance 605 or the possessed bonus point 606. Thus, for example, the item 7 such as a weapon or the like equipped by the player character 4 is not visually distinguishable in terms of the matters described above. Note that a configuration where the item as a result of the power up/evolution in return for the advertisement watching is identifiable in the game may be employed.

For example, the colors of the item as a result of the power up/evolution in return for the advertisement watching are preferably different from those of the same type of item that can be purchased through online shopping or the same type of item as a result of the power up/evolution performed by consuming the accumulated traveled distance 605 or the possessed bonus point 606. A validity expiration point may be set to the item as a result of the power up/evolution in return for the advertisement watching. Preferably, in such a configuration, the colors, the effects, or the display effects of such an item gradually change or change step by step as it gets closer to the expiration point.

What is claimed is:

1. A computer system comprising:
at least one processor or circuit programmed to:
control execution of a video game;
present an advertisement offer menu in the video game, wherein the advertisement offer menu is configured to receive a user input for either confirming or denying an offer, wherein the offer is for advertisement watching to be started, and
in response to receiving the user input from the offer menu confirming advertisement watching to be started, provide a visual display screen of a menu in the video game that presents to the user:
(a) a plurality of input element options, wherein each of the input element options is an entertainment element related to the video game and possessed by the user in the video game, wherein the input element options comprise options corresponding to:
(i) a base input element possessed by the user in the video game as a base to power-up/evolve, and
(ii) a material input element as a material to power-up/evolve the base input element in the video game,
wherein both the base input element and the material input element are used in a power-up/evolution in the video game, and
(b) a preview of a result of the power-up/evolution to be given with a selected base input element of the plurality of input elements and a selected material input element of the plurality of input elements;

receive a selection among the plurality of input element options from the user via the menu in the video game, wherein the selection comprises the user selecting:
(i) at least one of the input element options as the base input element as the base to power-up/evolve in the video game, and
(ii) at least another one of the input element options as the material input element as the material to power-up/evolve the base input element in the video game,
wherein the preview changes to reflect the result of the power-up/evolution to be given corresponding to the selected base input element and selected base material input element each time the selected base input element is selected or changed in the menu and each time the selected material input element is selected or changed in the menu:
in response to receiving a user input confirming the selection corresponding to a result of the power-up/evolution to be given corresponding to the selected base input element and selected base material input element, start advertisement watching and perform watching control of an advertisement for improvement control in return for advertisement watching, the improvement control including improving a parameter value of the selected base input element to achieve the previewed result of the power-up/evolution in the video game and that is 1) associated with the selected base input element, or 2) associated with the selected base input element and changing a display mode of the base input element in the video game; and
perform the improvement control that improves, by the power-up/evolution, the parameter value associated with the selected base input element in the video game when the watching control satisfies a completion equivalent condition.

2. The computer system as defined in claim 1, wherein the at least one processor or circuit is further programmed to select the advertisement as a target of the watching control based on an operation input by the user.

3. The computer system as defined in claim 1, wherein the at least one processor or circuit is further programmed to determine a level of improving the parameter value in the improvement control at least based on the advertisement that is a target of the watching control.

4. The computer system as defined in claim 1, wherein the at least one processor or circuit is further programmed to perform watching setting related to the watching control.

5. The computer system as defined in claim 4, wherein the at least one processor or circuit is further programmed to determine a level of improving the parameter value in the improvement control at least based on the watching setting.

6. The computer system as defined in claim 1, wherein in response to receiving the user input including selecting the material input element based on an operation input by the user, the at least one processor or circuit is further programmed to determine a level of improving the parameter value in the improvement control at least based on the material input element.

7. The computer system as defined in claim 6, wherein the at least one processor or circuit is further programmed to determine the level of improving the parameter value in the improvement control based on a combination, the combination being a combination of entertainment elements, possessed by the user, which are the same as at least one of the base input element and the material input element or based on a combination of the selected base input element and the selected material input element.

8. The computer system as defined in claim 7, wherein the at least one processor or circuit is further programmed to determine the level of improving the parameter value in the improvement control based on a predetermined compatibility between the base input element and the advertisement as a target of the watching control.

9. The computer system as defined in claim 6, wherein the at least one processor or circuit is further programmed to determine the level of improving the parameter value in the improvement control based on a predetermined compatibility between the base input element and the advertisement as a target of the watching control.

10. The computer system as defined in claim 1, wherein in response to receiving the user input including selecting the base input element serving as the base and the material input element serving as the material based on an operation input by the user, the at least one processor or circuit is further programmed to:
determine a level of improving the parameter value of the base input element serving as the base in the improvement control based on the material input element serving as the material; and
consume the material input element serving as the material.

11. The computer system as defined in claim 10, wherein the at least one processor or circuit is further programmed to determine the level of improving the parameter value in the improvement control based on a predetermined compatibility between the base input element and the advertisement as a target of the watching control.

12. The computer system as defined in claim 1, wherein the advertisement is associated with information indicating a designated position,
wherein the at least one processor or circuit is further programmed to:
acquire positional information indicating a position of the user; and
determine the level of improving the parameter value in the improvement control at least based on positional relationship between the designated position and the position indicated by the positional information.

13. The computer system as defined in claim 1, wherein the entertainment elements are associated with a valid period during which the entertainment elements are selectable as the base input element,
wherein the at least one processor or circuit is further programmed to select the base input element from each of the entertainment elements having the unexpired valid period.

14. The computer system as defined in claim 1, wherein the at least one processor or circuit is further programmed to provide the preview of a content of the improvement control to be performed when the completion equivalent condition is satisfied, before the watching control satisfies the completion equivalent condition.

15. The computer system as defined in claim 1, wherein the at least one processor or circuit is further programmed to set a performing possibility of the improvement control,
wherein to improve the improvement control, the at least one processor or circuit is further programmed to determine to perform the improvement control based on the performing possibility.

16. The computer system as defined in claim 15, wherein the at least one processor or circuit is further programmed to change the performing possibility based on a progress of the watching control in such a manner that the performing possibility is set to gradually increase toward the end of the watching control of the advertisement.

17. An advertisement output control system comprising:
a server system that is the computer system as defined in claim 1; and
a user terminal to which the user inputs an operation,
wherein the server system and the user terminal are configured to communicate with each other.

18. An advertisement output control device comprising an operation input section to which the user inputs an operation, the advertisement output control device being the computer system as defined in claim 1.

19. The computer system as defined in claim 1, wherein the at least one processor or circuit is further programmed to:
present, by the watching control that is started by the user input that confirms advertisement watching to be started, a further menu to select the parameter value to be used in power-up/evolution of the base input element of the video game; and
use, in the video game, the result of the power-up/evolution that was given to the user based on the selected base input element and the selected material input element used in the improvement control.

20. The computer system of claim 1, wherein the advertisement offer menu provides a first user input for accepting the offer and a second user input for accepting the offer,
wherein the first user input confirms advertisement watching only and starts advertisement watching only; and
wherein the second user input confirms the advertisement watching with watching control to improve the parameter value.

* * * * *